(12) United States Patent
Fisher

(10) Patent No.: US 11,060,469 B2
(45) Date of Patent: Jul. 13, 2021

(54) SYSTEMS FOR A MULTI-FUEL CAPABLE ENGINE

(71) Applicant: Transportation IP Holdings, LLC, Norwalk, CT (US)

(72) Inventor: Kevin Michael Fisher, Northeast, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 0 days.

(21) Appl. No.: 17/028,925

(22) Filed: Sep. 22, 2020

(65) Prior Publication Data
US 2021/0003085 A1 Jan. 7, 2021

Related U.S. Application Data

(62) Division of application No. 15/683,298, filed on Aug. 22, 2017, now Pat. No. 10,837,378, which is a division of application No. 14/319,364, filed on Jun. 30, 2014, now Pat. No. 9,784,194.

(51) Int. Cl.
| | |
|---|---|
| *F02D 41/00* | (2006.01) |
| *F02D 41/22* | (2006.01) |
| *F02D 41/14* | (2006.01) |
| *F02D 11/10* | (2006.01) |

(52) U.S. Cl.
CPC ..... *F02D 41/0027* (2013.01); *F02D 41/0025* (2013.01); *F02D 41/22* (2013.01); *F02D 41/1446* (2013.01); *F02D 41/1448* (2013.01); *F02D 2011/102* (2013.01); *F02D 2041/228* (2013.01); *Y02T 10/40* (2013.01)

(58) Field of Classification Search
CPC .. F02D 41/0027; F02D 41/0025; F02D 41/22; F02D 41/1446
See application file for complete search history.

(56) References Cited

U.S. PATENT DOCUMENTS

| | | | | |
|---|---|---|---|---|
| 5,715,786 | A * | 2/1998 | Seiberth | F02D 41/22 123/198 D |
| 2013/0311067 | A1* | 11/2013 | Stockner | F02D 19/08 701/104 |

\* cited by examiner

*Primary Examiner* — Kevin A Lathers
(74) *Attorney, Agent, or Firm* — McCoy Russell LLP

(57) ABSTRACT

Various methods and systems are provided for a multi-fuel capable engine. The system includes a liquid fuel system to deliver liquid fuel to an engine, a gaseous fuel system to deliver gaseous fuel to the engine, and a control system. The control system, during a gaseous fuel system test mode, controls the liquid fuel system and the gaseous fuel system to deliver the liquid fuel and the gaseous fuel to the engine over a range of engine operating points, and indicate degradation of the gaseous fuel system based on engine output at each of the engine operating points.

13 Claims, 8 Drawing Sheets

SYSTEMS FOR A MULTI-FUEL CAPABLE ENGINE

CROSS-REFERENCE TO RELATED APPLICATIONS

This application is a divisional of U.S. patent application Ser. No. 15/683,298, entitled "SYSTEMS FOR A MULTI-FUEL CAPABLE ENGINE," filed on Aug. 22, 2017, which is a divisional of U.S. patent application Ser. No. 14/319,364, entitled "SYSTEMS FOR A MULTI-FUEL CAPABLE ENGINE," filed on Jun. 30, 2014. The entirety of the above-identified applications are hereby incorporated by reference for all purposes.

FIELD

Embodiments of the subject matter disclosed herein relate to multi-fuel capable engine systems.

BACKGROUND

Some stationary power plants and some vehicles may include an engine that is powered by one or more fuel sources to generate mechanical energy. Mechanical energy may be converted to electrical energy that is used to power traction motors and other components and systems of the vehicle. During use, some of the engine parts might wear, warp, or degrade. This may affect their performance over time. It may be desirable to have a system that accounts for such changes over time to maintain or improve performance.

BRIEF DESCRIPTION

In one embodiment, a system comprises a liquid fuel system to deliver liquid fuel to an engine, a gaseous fuel system to deliver gaseous fuel to the engine, and a control system. The control system is configured to, during a gaseous fuel system test mode, control the liquid fuel system and the gaseous fuel system to deliver the liquid fuel and the gaseous fuel to the engine over a range of engine operating points, and indicate degradation of the gaseous fuel system based on engine output at each of the engine operating points.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to various embodiments of methods and systems for a multi-fuel capable engine. In one example, the multi-fuel capable engine receives liquid fuel from a liquid fuel system and receives gaseous fuel from a gaseous fuel system. The liquid fuel may comprise one or more of gasoline, diesel, ethanol, or other fuel type. The gaseous fuel may comprise one or more of compressed natural gas, liquefied natural gas, hydrogen, or other fuel type. The multi-fuel capable engine may be installed in a vehicle, such as a rail vehicle, in a stationary platform, in a marine vessel, or other suitable system. The multi-fuel capable engine may be controlled via a control system. For example, the control system may be configured to, during a gaseous fuel system test mode, control the liquid fuel system and the gaseous fuel system to deliver the liquid fuel and the gaseous fuel to the engine over a range of engine operating points, and indicate degradation of the gaseous fuel system based on engine output at each of the engine operating points.

Figure 1:
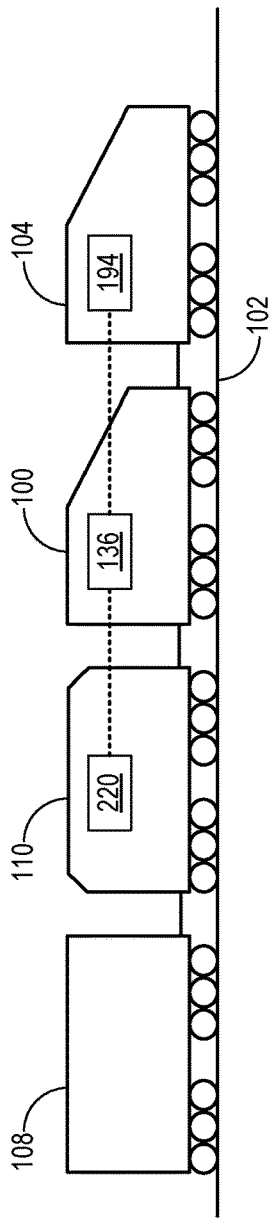
FIG. 1 shows a schematic diagram of two locomotives, a fuel tender, and a freight car according to an embodiment of the invention.
Figure 2:
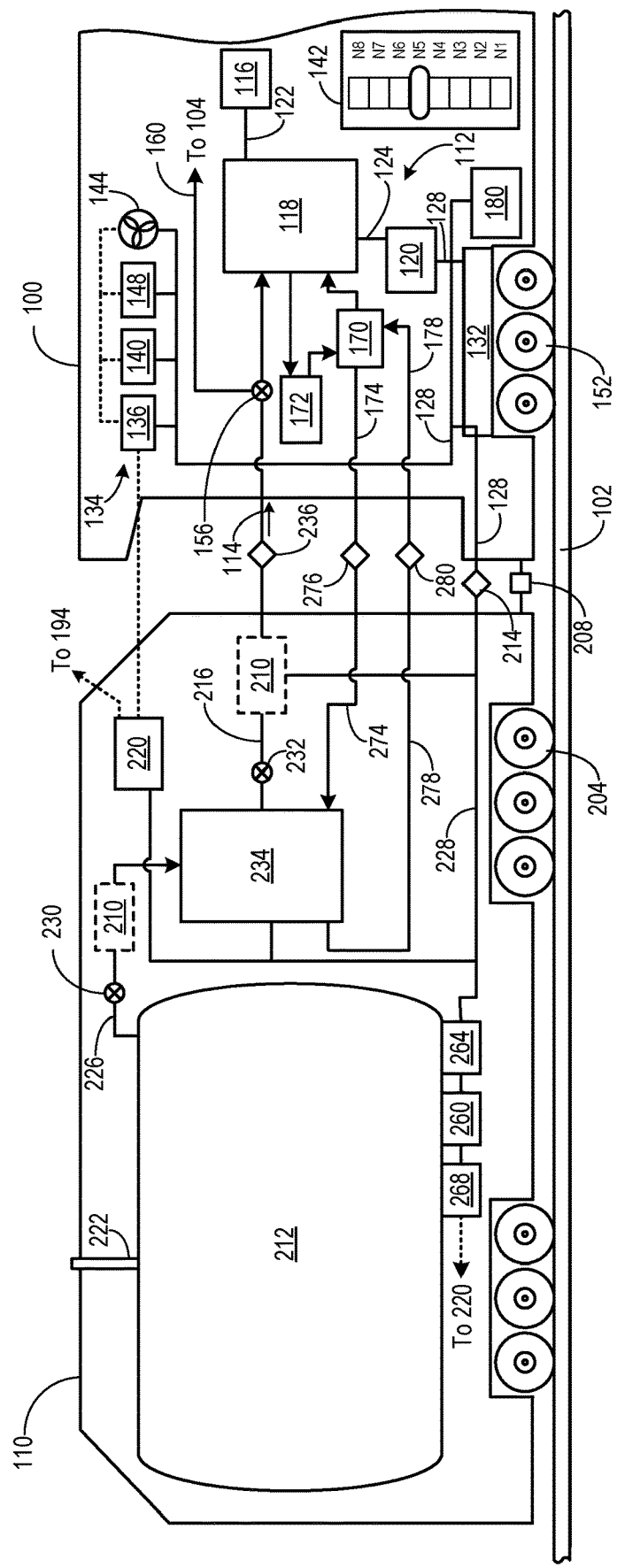
FIG. 2 shows a schematic diagram of an example fuel tender and natural gas-fueled locomotive according to an embodiment of the invention.
Figure 3:
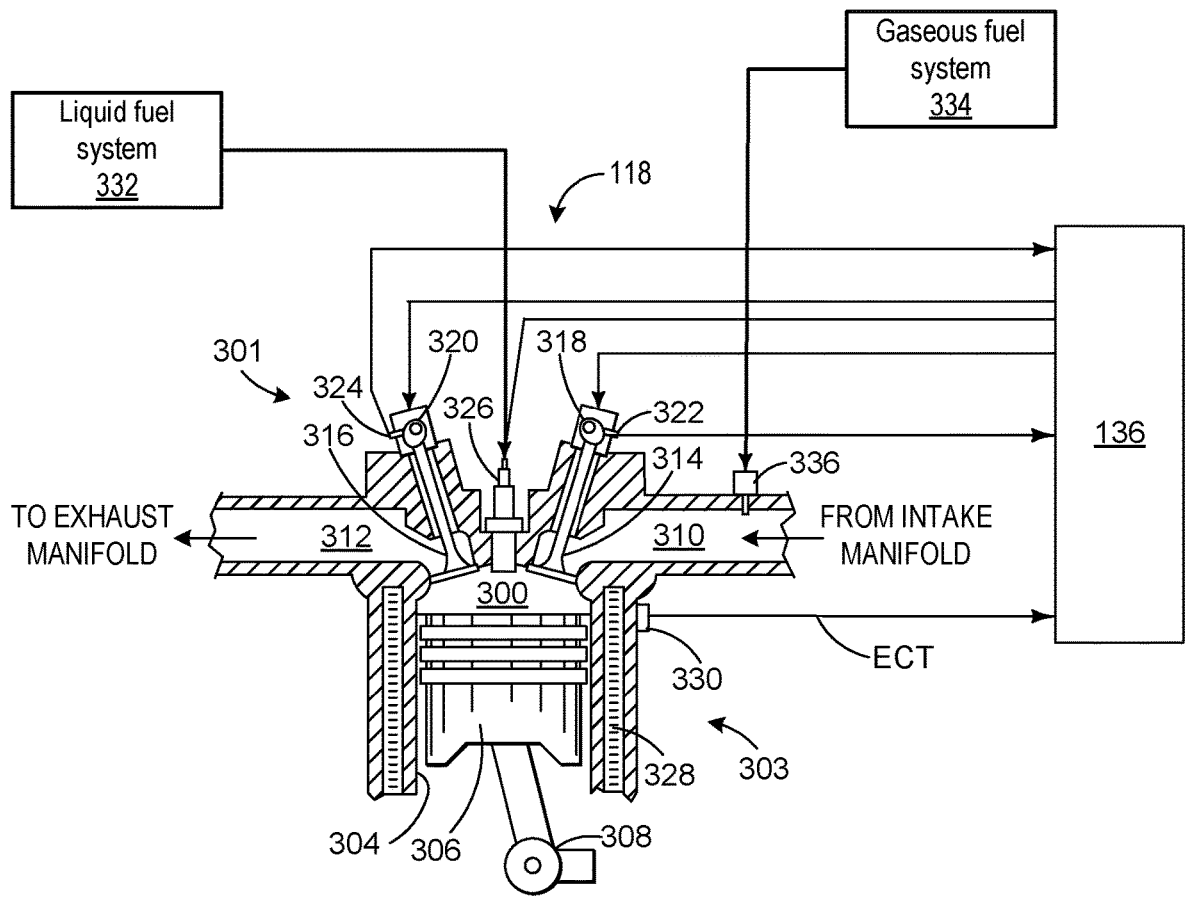
FIG. 3 shows a schematic diagram of a cylinder of a multi-fuel engine according to an embodiment of the invention.
Figure 4:
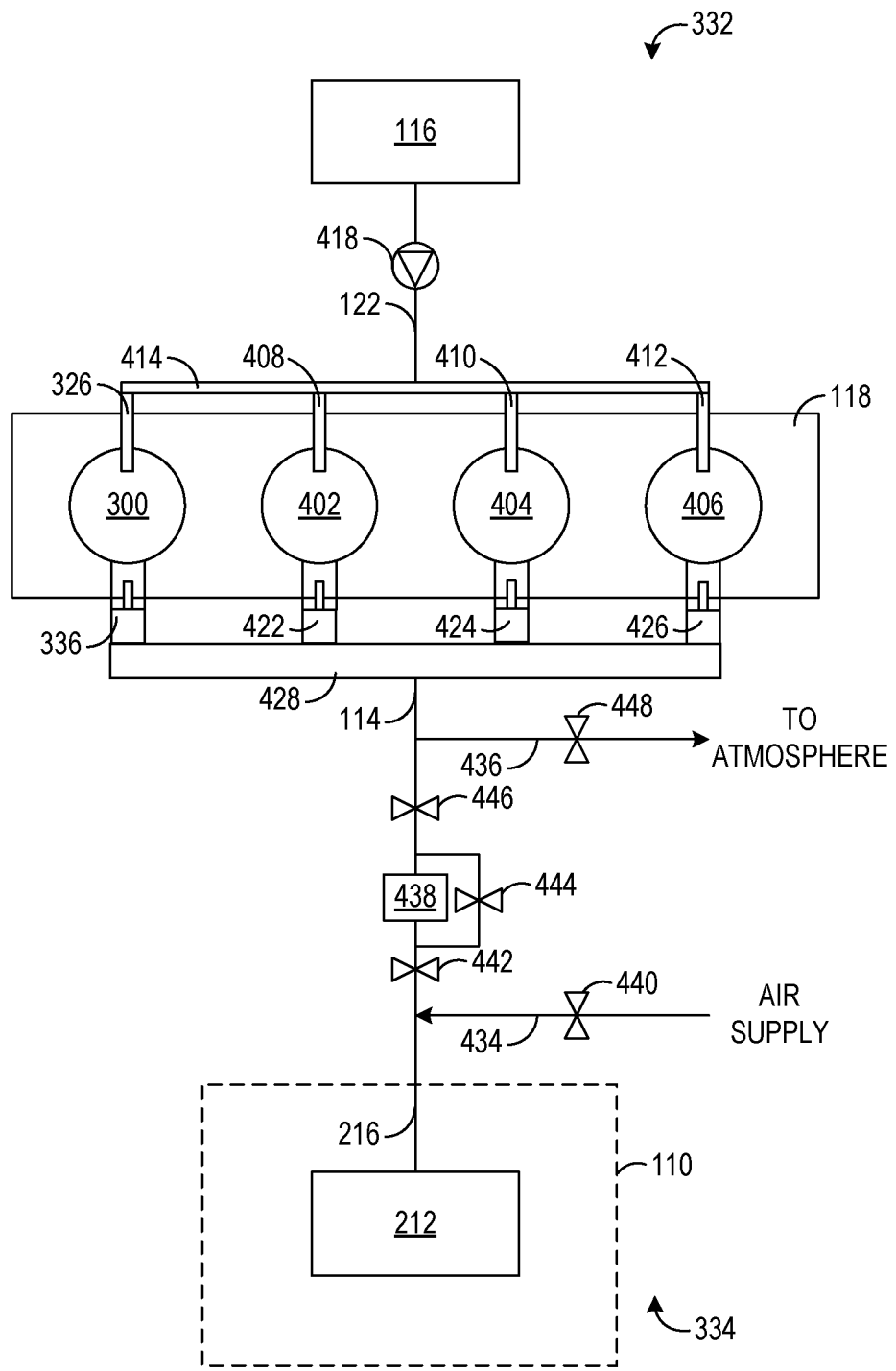
FIG. 4 shows a schematic diagram of a multi-fuel engine according to an embodiment of the invention.
Figure 5:
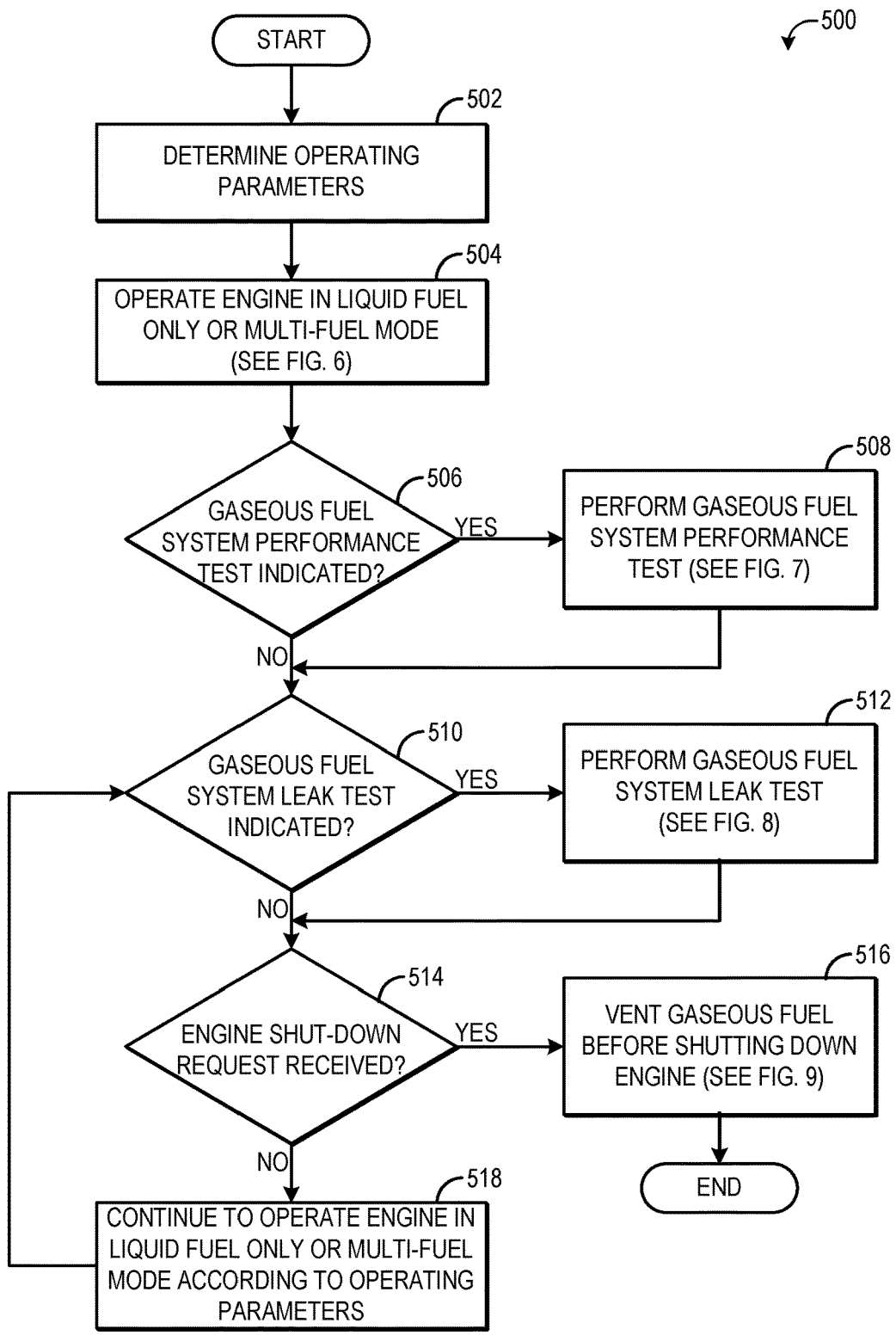
FIG. 5 is a high-level flow chart for operating a multi-fuel engine in one or more selected modes according to an embodiment of the invention.
Figure 6:
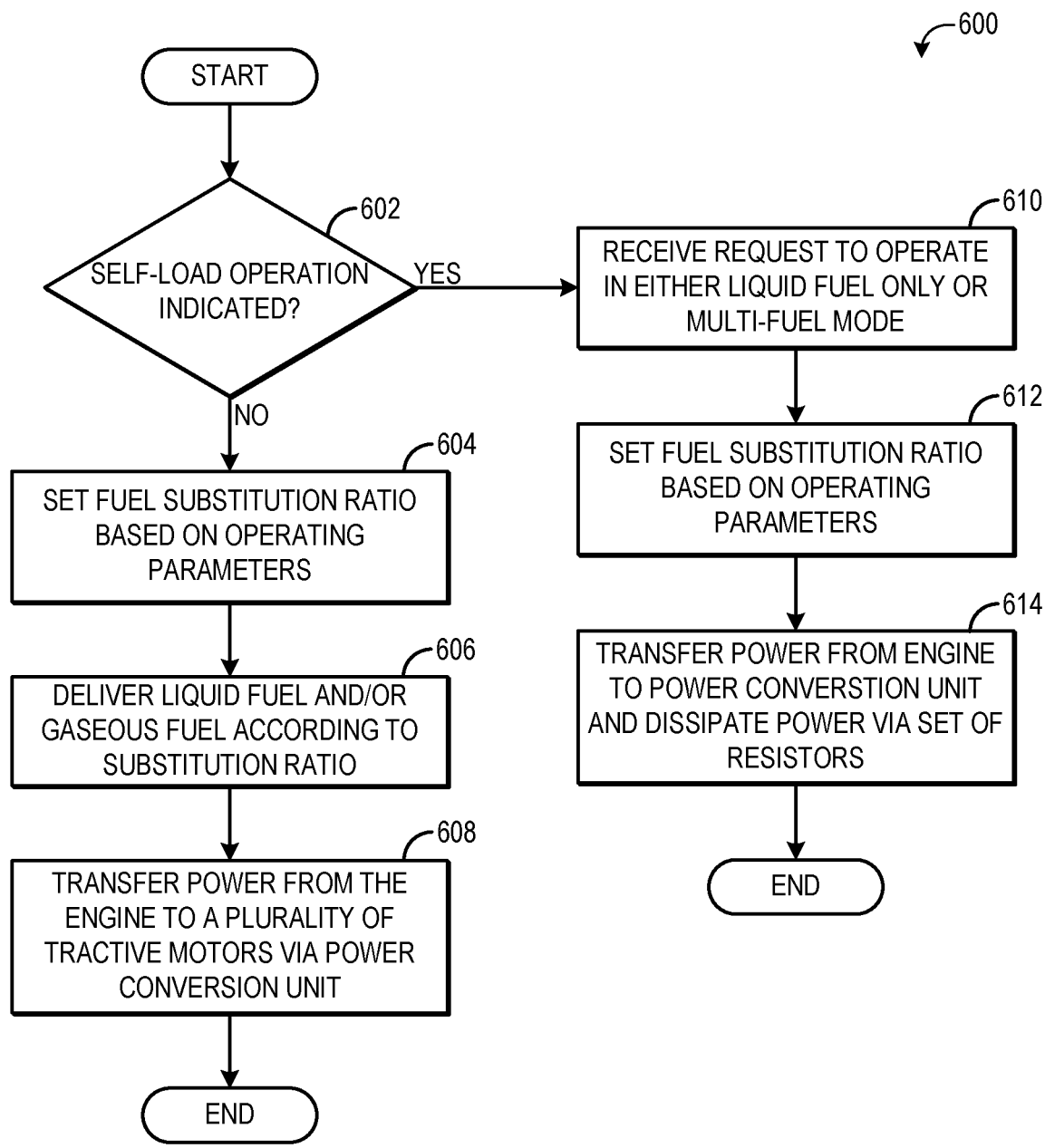
FIG. 6 is a flow chart illustrating a method for operating a multi-fuel engine according to an embodiment of the invention.
Figure 7:
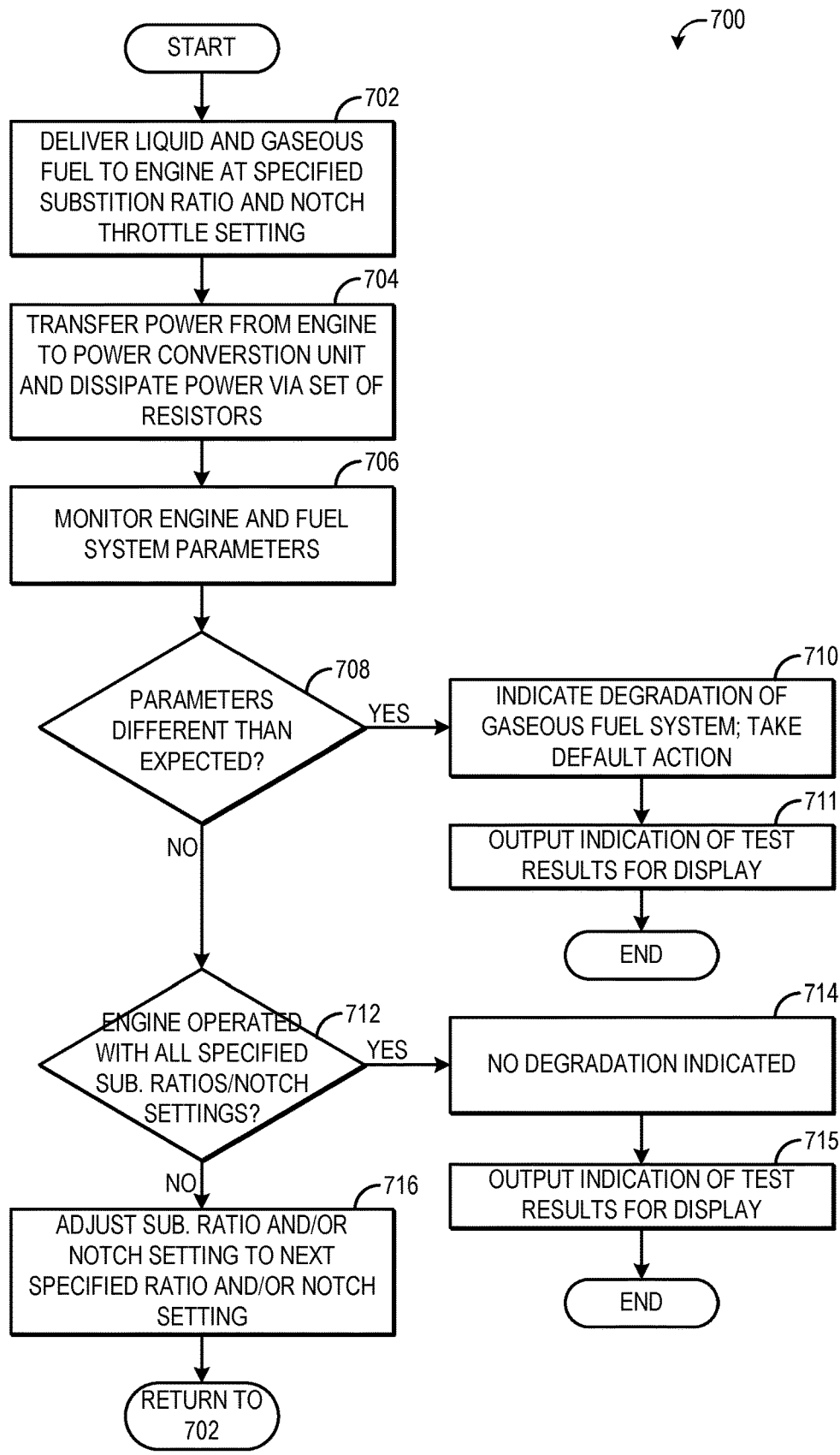
FIG. 7 is a flow chart illustrating a method for operating a multi-fuel engine in a gaseous fuel system performance test mode according to an embodiment of the invention.
Figure 8:
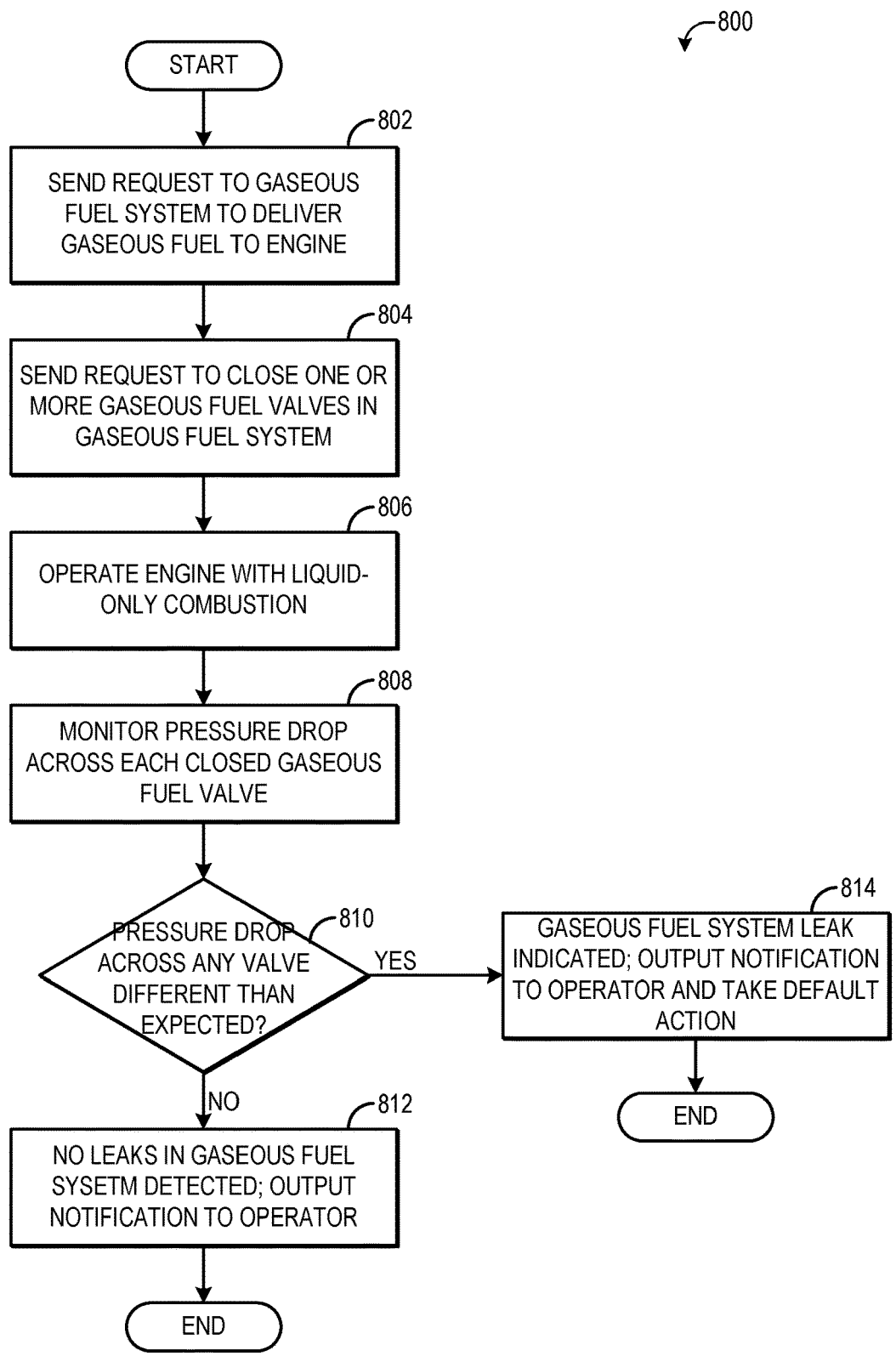
FIG. 8 is a flow chart illustrating a method for operating a multi-fuel engine in a gaseous fuel system leak test mode according to an embodiment of the invention.
Figure 9:
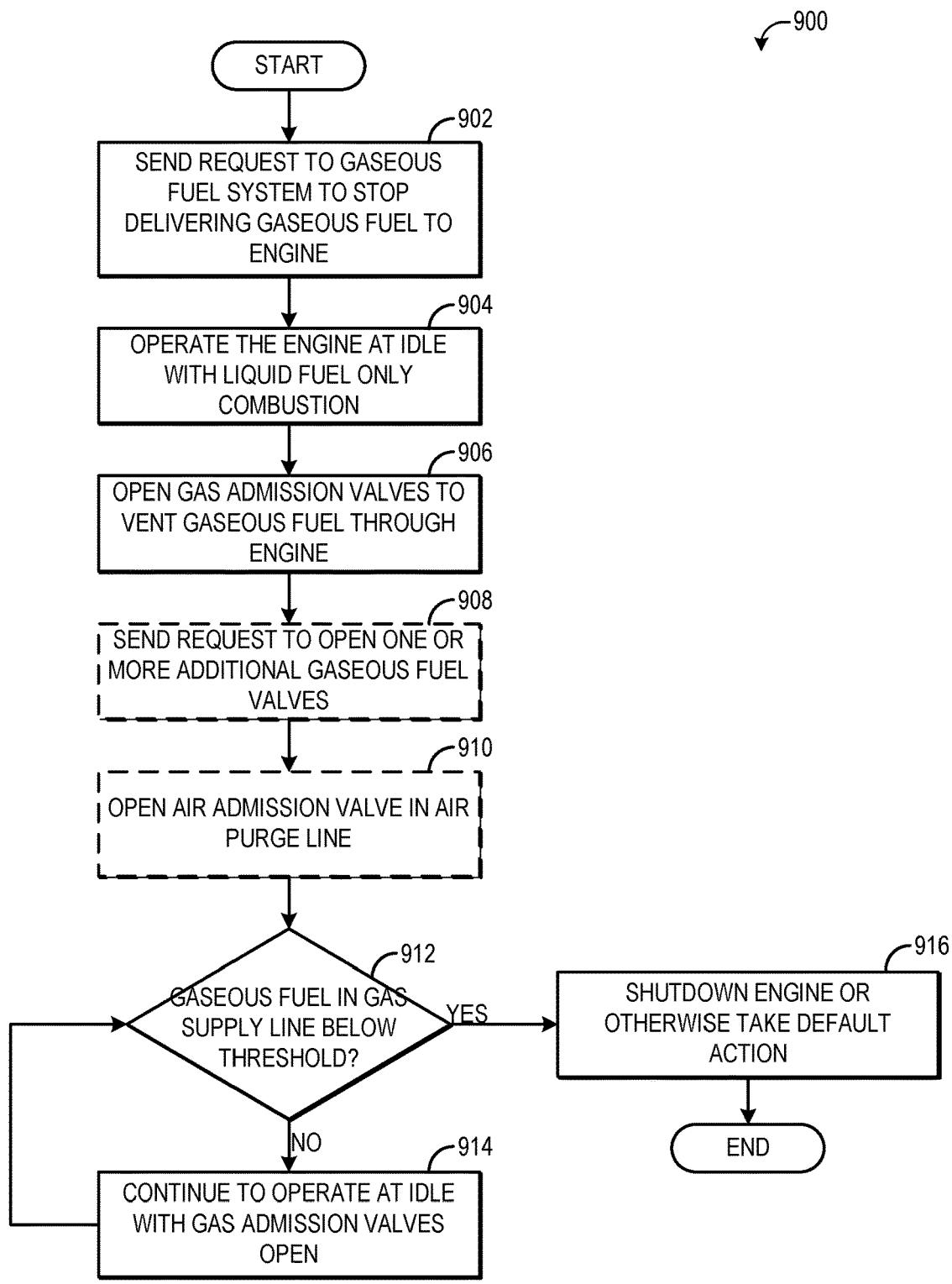
FIG. 9 is a flow chart illustrating a method for operating a multi-fuel engine in a gaseous fuel vent mode according to an embodiment of the invention.

An example platform supporting a multi-fuel capable engine is illustrated in FIGS. 1-2. Additional details of the multi-fuel capable engine are illustrated in FIGS. 3-4. As explained above, the multi-fuel capable engine combusts liquid fuel, such as diesel, as well as gaseous fuel, such as natural gas, during certain operating modes, as illustrated in FIGS. 5-6. To ensure the gaseous fuel system is operating as desired, for example to ensure the gaseous fuel system is sending gaseous fuel at a commanded rate, a gaseous fuel system performance test may be carried out, as illustrated in FIG. 7. Further, to prevent leakage of the gaseous fuel to atmosphere, a gaseous fuel system leak test may be performed, as illustrated in FIG. 8, and/or excess gaseous fuel in the gaseous fuel system supply lines may be vented through the engine and exhaust system prior to engine shutdown, as illustrated in FIG. 9. In doing so, desired performance of the gaseous fuel system may be ensured while minimizing emissions.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

With reference to FIG. 1, a schematic diagram illustrates a consist of vehicles. This consist includes a first locomotive 100, a second locomotive 104, a tender 110, and a freight car 108. The tender is a fuel tank that may carry one or more fuel for supply to one or more coupled locomotive. Specifically, FIG. 1 shows the first locomotive removably coupled to the second locomotive and removably coupled to the fuel tender. The fuel tender is shown removably coupled to the freight car. Additional fuel tenders, freight cars, locomotives, and/or other railroad vehicles may be removably connected to the freight car and/or the second locomotive. The order of the various railroad vehicles shown in FIG. 1 may be modified. For example, FIG. 1 shows the second locomotive as the lead vehicle of the consist and the freight car as the trail vehicle. However, in other embodiments the first locomotive may be the trail vehicle. In one embodiment, the first locomotive may be the lead vehicle with the tender coupled between the first locomotive and the second locomotive. In this example, the fuel tender provides natural gas fuel, in this case compressed natural gas (CNG) to both the first locomotive and the second locomotive. In some embodiments, the tender may send CNG directly to the first locomotive through a first fluidic coupling and send CNG directly to the second locomotive through a second fluidic coupling.

The first locomotive, the second locomotive, the tender, and the freight car are configured to run on a rail 102 (or set of rails) via a plurality of wheels. In FIG. 1, the tender is positioned behind the first locomotive and removably coupled to the freight car. In other configurations, the tender may be positioned in front of the locomotive and/or may not be connected to the freight car or other rail car. In still other configurations, one or more other rail cars may be located between the tender and the first locomotive. In another configuration, the tender may be located between the first locomotive and the second locomotive.

In one example the first locomotive and second locomotive are powered for propulsion, while the tender and freight car are non-powered. It will be appreciated that in other examples one or more of the tender and freight car may also be powered for propulsion by, for example, one or more traction motors.

Additionally, FIG. 1 shows a tender controller 220 on board the tender, a first locomotive controller 136 on board the first locomotive, and a second locomotive controller 194 on board the second locomotive. As described further below, the first locomotive controller controls operation of a primary engine 118 and the tender controller controls operation of the tender. However, the first locomotive controller may send signals and/or requests (e.g., commands) to the tender controller regarding operation of the tender. For example, the first locomotive controller may send a request to the tender controller of the tender to convert liquid natural gas to gaseous natural gas and send the gaseous natural gas via one or more fuel lines to an engine of the first locomotive, as described further below. Further, the first locomotive controller may include instructions stored thereon (e.g., within a memory of the controller) for sending a plurality of requests to the tender controller and to components on board the tender. The tender controller may then control actuators and/or components on board the tender based on the requests sent from the first locomotive controller on board the first locomotive. As shown in FIG. 1, the tender controller, first locomotive controller, and second locomotive controller all communicate electronically with one another.

Turning now to FIG. 2, the first locomotive includes an engine system 112 that comprises an engine 118 having a plurality of cylinders. The engine may be referred to herein as the locomotive engine. In one embodiment, each cylinder has at least one gaseous admission valve to admit gaseous fuel to the cylinder and at least one liquid fuel injector to inject liquid fuel to the cylinder. However, other configurations are possible, such as single-point gaseous fuel fumigation system where the gaseous fuel is mixed with the intake air upstream of the cylinders (e.g., in an intake manifold or intake passage) rather than supplied to each cylinder individually. In an example, the first locomotive has an engine system that operates on plural fuel types, such as a first fuel and a second fuel. The fuel types may include a liquid fuel and a gaseous fuel. Suitable liquid fuels may include diesel fuel, while suitable gaseous fuel may include natural gas. The engine is a multi-fuel capable engine. Examples of suitable multi-fuel capable engines may include a gas turbine, compression ignition engine, or spark ignition engine. A gaseous fuel may be natural gas that is received from the tender via a compressed natural gas (CNG) fluidic coupling 114 (e.g., fuel line), and a second fuel may be diesel fuel received from a diesel storage tank 116 via a liquid fuel fluidic coupling 122 on board the first locomotive. Other examples of engine systems may use various combinations of fuels other than diesel and natural gas, such as ethanol and hydrogen. In an example, gaseous fuel from the tender (e.g., natural gas) is supplied to the cylinders to form a gaseous fuel/air mixture that is combusted due to compression ignition of the injected liquid fuel (e.g., diesel fuel). The relative ratio of gaseous fuel to liquid fuel as well as injection timing of the liquid fuel may be adjusted based on various operating parameters.

The engine generates torque that is transmitted to a power conversion unit 120 along a drive shaft 124. The power conversion unit is configured to convert the torque into electrical energy that is delivered via a first electrical bus 128 to at least one traction motor 132 and to a variety of downstream electrical components in the first locomotive. Such components may include, but are not limited to, compressors 140, blowers 144, batteries 148, an electronics control system 134 including one or more controllers, shut-off valves, pressure regulators, radiators, lights, on-board monitoring systems, displays, climate controls (not shown), and the like. The first electrical bus may deliver electrical energy to the tender.

Based on the nature of the generated electrical output, the first electrical bus may be a direct current (DC) bus (as depicted) or an alternating current (AC) bus. In one example the power conversion unit includes an alternator (not shown) that is connected in series to one or more rectifiers (not shown) that convert the alternator's electrical output to DC electrical power prior to transmission along the first electrical bus. The alternator may include, for example, a high-speed generator, a generator machine whose stator flux is synchronous to the rotor flux, or an asynchronous machine.

Based on the configuration of a downstream electrical component receiving power from the first electrical bus, one or more inverters may be configured to invert the electrical power from the first electrical bus prior to supplying electrical power to the downstream component. In one example, a single inverter may supply AC electrical power from a DC electrical bus to a plurality of components. In another non-limiting embodiment, each of a plurality of distinct inverters may supply electrical power to a distinct component.

The traction motor receives electrical power from the power conversion unit and is coupled to one or more axles/driving wheels 152. In this manner, the traction motor is configured to drive the axles/driving wheels along the rail. It should be appreciated that the number of sets of axles/ driving wheels may vary, and that one or more traction motors may be provided for each set of axles/driving wheels. The traction motor may be an AC motor. Accordingly, an inverter paired with the traction motor may convert DC input to an appropriate AC input, such as a three-phase AC input, for subsequent use by the traction motor. In other non-limiting embodiments, the traction motor may be a DC motor directly employing the output of the power conversion unit after rectification and transmission along the DC electrical bus.

One example locomotive configuration includes one inverter/traction motor pair per axle/driving wheel. The traction motor may also be configured to act as a generator providing dynamic braking to brake the first locomotive. In particular, during dynamic braking, the traction motor may provide torque in a direction that is opposite from the rolling direction, thereby generating electricity that is dissipated as heat by a power dissipation unit (e.g., set of resistors) 180 connected to the first electrical bus. The set of resistors (also referred to as a resistive grid) may be configured to dissipate excess engine torque via heat produced by the grids from electricity generated by the power conversion unit.

The first locomotive controller on board the first locomotive controls the engine by sending commands to various engine control hardware components such as invertors, alternators, relays, fuel injectors, gas admission valves, fuel pumps (not shown), or the like. As described further below, in one example, the first locomotive controller also monitors locomotive operating parameters in active operation, idle, and shutdown states. Such parameters may include, but are not limited to, manifold air temperature (MAT), ambient temperature, engine oil temperature, compressor air pressure, main air reserve pressure, battery voltage, a battery state of charge, brake cylinder pressure, or the like. The first locomotive controller further includes computer readable storage media (not shown) including code for enabling on-board monitoring and control of rail vehicle operation.

The first locomotive controller, while overseeing control and management of the engine and other locomotive components, may be configured to receive signals from a variety of engine sensors, as further described herein. The first locomotive controller may utilize such signals to determine operating parameters and operating conditions, and correspondingly adjust various engine actuators to control operation of the first locomotive. For example, the first locomotive controller may receive signals from various engine sensors including, but not limited to, engine speed, engine load, boost pressure, exhaust pressure, ambient pressure, exhaust temperature, manifold pressure (MAP), or the like. Correspondingly, the first locomotive controller may control the first locomotive by sending commands to various components such as traction motors, alternators, cylinder valves, throttles, or the like. As described further below, the first locomotive controller at least partially controls operation of the fuel tender by sending commands (e.g., requests) to the tender controller on board the fuel tender. For example, the commands sent to the tender controller may include commands for controlling various components on board the fuel tender such as a vaporizer 234, a pump 210, a LNG storage tank 212, or the like. In another example, the commands sent to the tender controller may include requests for CNG (e.g., a request to send CNG to the first locomotive). Then, in response to the request for CNG, the tender controller may adjust one or more of the vaporizer, the pump, and/or one or more valves controlling flow of LNG and/or CNG in order to deliver the requested CNG to the first locomotive.

In some examples, the vaporizer may be referred to as a regasification unit. For purposes of this description, an "on-board" component, device, or other structure means that the component or device is physically located on the vehicle being described. For example, with respect to the tender, a component or structure physically located on the fuel tender is on board the fuel tender, including when the fuel tender is coupled to a locomotive or other rail vehicle and when the fuel tender is not coupled to a locomotive or other rail vehicle.

In one example, the computer readable storage media configured in the first locomotive controller may execute code to auto-stop or auto-start the engine by enabling, for example, an Automatic Engine Start/Stop (AESS) control system routine. As discussed in more detail below, the first locomotive controller also communicates with the tender controller on board the tender to, for example, request delivery of gaseous natural gas for the engine. As shown in FIGS. 1-2, the first locomotive controller also communicates with the second locomotive controller in the second locomotive to, for example, coordinate pass-through delivery of gaseous natural gas from the tender to a natural-gas fueled engine in the second locomotive. The computer readable storage media configured in the first locomotive controller may execute code to appropriately transmit and receive such communications.

With continued reference to FIG. 2, the tender is removably coupled to the first locomotive and includes axles/wheels 204 configured to travel along the rail. In the depicted example, the tender includes six pairs of axles/wheels. In another example, the tender includes four pairs of axles/wheels. The tender further includes a mechanical coupling mechanism 208 that removably couples the fuel tender to the first locomotive for linked movement thereof. In other examples, the tender may include a second coupling mechanism (not shown) that may removably couple the fuel tender to another rail vehicle, such as the freight car or an additional locomotive (e.g., such as the second locomotive).

The tender is configured to carry one or more fuel storage tanks. In one embodiment, as shown in FIG. 2, the tender includes an on-board cryogenic LNG storage tank for storing LNG. The LNG storage tank is a fuel container wherein the fuel stored in the fuel container is LNG. In one example, the LNG storage tank may take the form of a vacuum-jacketed pressure vessel that stores LNG at pressures ranging from approximately 10 psi to approximately 130 psi. It will be appreciated that to maintain LNG in a liquid state, the LNG may be stored at a temperature range of approximately 4-80 degrees Celsius. In another example, the LNG may be stored at a temperature above or below the range of 4-80 degrees Celsius. In yet another example, the LNG may be stored at a temperature range of approximately 60-120 degree Celsius. In some examples, as shown in FIG. 2, the tender includes a cryogenic unit 268 for helping maintain the LNG within desired temperature and pressure ranges. In other example, the tender may not include the cryogenic unit. Even with efficient insulation and cryogenic refrigeration equipment, heat may leak into the LNG storage tank and causes vaporization of portions of the LNG into boil-off gas.

It will also be appreciated that the LNG storage tank may have various sizes and configurations and may be removable from the tender. Further, as shown in FIG. 2, the storage tank is configured to receive LNG from an external refueling station via port 222. In alternate examples, the storage tank may revive LNG through another port or location on the storage tank.

The LNG storage tank supplies LNG via cryogenic LNG fluidic coupling 226 and one or more valves 230 to the vaporizer. The vaporizer converts the LNG into gaseous or compressed natural gas (CNG), or vaporizes the LNG, by the application of heat to the LNG. Specifically, the vaporizer vaporizes the LNG to CNG by utilizing heated fluid supplied to the vaporizer. As shown in in FIG. 2, heated fluid for the conversion of LNG to CNG is generated by a heat exchanger 170 positioned on the first locomotive. The heat exchanger receives engine cooling water from a radiator 172. Engine cooling water from the engine flows to the radiator to be cooled and then sent back to the engine. Before the cooled engine cooling water flows back to the engine, the cooled engine cooling water passes through the heat exchanger to heat a secondary fluid, or coolant. The coolant heated at the heat exchanger then flows from the heat exchanger to the vaporizer on the tender via a first heated coolant line 174 and a second heated coolant line 274. The first heated coolant line and the second heated coolant line are coupled together at a detachable interface coupling 276 that enables the tender to be decoupled from the first locomotive. Coolant then returns to the heat exchanger via a first coolant line 278 and a second coolant line 178. The first coolant line and the second coolant line are coupled together at a detachable interface coupling 280 that enables the tender to be decoupled from the first locomotive. In alternate embodiments, heat may be supplied to the vaporizer from an alternative source on board the first locomotive, another locomotive, and/or fuel tender. Further, additional and/or alternative liquid or gas sources may be used to provide heat to the vaporizer.

The CNG is then delivered to the engine of the first locomotive to power the engine. As shown in FIG. 2, the CNG is delivered to the engine via CNG fluidic coupling 216 and CNG fluidic coupling and one or more control valves 232. In some examples, as shown in FIG. 2, a pass-through control valve 156 is provided to direct at least a portion of the CNG through the first locomotive via a pass through fluidic coupling 160 to the second locomotive. In this manner, a natural gas-fueled engine in the second locomotive may be powered by gaseous natural gas from the tender. In alternate examples, there may not be a control valve and CNG may only be delivered to the first locomotive. In yet another example, additional control valves may be positioned in the CNG fluidic coupling to direct CNG to additional locomotives or rail cars. In some examples, additional control valves may be positioned in the CNG fluidic coupling to direct CNG to additional locomotives or rail cars. For example, in an embodiment wherein the tender is positioned between the first locomotive and the second locomotive, the tender may send CNG to the first locomotive and the second locomotive through separate fluidic couplings. As such, the second locomotive may receive CNG directly from the tender and not through another locomotive.

In a first embodiment, the LNG storage tank may be a higher pressure LNG storage tank wherein the LNG is maintained at a pressure greater than a threshold supply pressure. In one example, the threshold supply pressure of CNG may be approximately 120 psi. The pressure within the LNG storage tank may then be maintained above 120 psi (e.g., 160 psi) so the CNG arriving at the first locomotive is at the threshold supply pressure. In other examples, the threshold supply pressure of CNG may be greater or less than 120 psi and the LNG storage tank pressure may be maintained at a level greater than the threshold supply pressure to account for any pressure losses in the CNG supply system. In this first embodiment, LNG is metered from the LNG storage tank and to the vaporizer by the valve 230, or other metering device. CNG converted from the LNG at the vaporizer then flows to the first locomotive via the CNG fluidic coupling. The flow of CNG to the first locomotive is controlled or metered via the valve 232.

In a second embodiment, the LNG storage tank may be a lower pressure LNG storage tank wherein the LNG is maintained at a pressure lower than the threshold supply pressure (e.g., less than 120 psi). For example, the LNG storage tank may maintain the LNG at a lower pressure of 50 psi. In this embodiment, the pump may be positioned in the LNG fluidic coupling to control a flow (e.g., flow rate) of LNG to the vaporizer and/or in the CNG fluidic coupling to control a flow (e.g., flow rate) of CNG to the first locomotive. In alternate embodiments, the pump may be positioned additionally or alternatively on the first locomotive.

The CNG fluidic coupling further includes a detachable interface coupling 236 that enables the tender to be decoupled from the locomotive. It will also be appreciated that in other embodiments the pass-through control valve may be located on board the tender, along with suitable fluidic couplings to pass through the fluidic coupling.

It will be appreciated that by converting the LNG to CNG on board the tender and supplying CNG to the engine, standard gaseous natural gas conduit and interface couplings may be utilized between the fuel tender and the locomotive. Advantageously, such a configuration avoids costly cryogenic tubing and interface couplings, and the corresponding design challenges, that would otherwise be required for transferring LNG between the tender and the locomotive. Additionally, using such standard, low pressure gaseous natural gas fluidic and interface couplings eliminates the possibility of LNG leaks between the tender and locomotive.

Components on the tender are powered with electrical energy from the first locomotive. Specifically, the first electrical bus is coupled to a second electrical bus 228 at a detachable interface coupling 214. The detachable interface coupling enables the tender to be decoupled from the first locomotive. The first electrical bus and the second electrical bus may be referred to herein as electrical energy lines. In one embodiment, the rail vehicle may include one or more electrical energy lines traversing a space between the first locomotive and the tender.

Electrical energy generated at the first locomotive travels to the tender through the second electrical bus. Components on board the tender receive electrical energy via the second electrical bus. Such components may include, but are not limited to, the vaporizer, tender controller, control valves 230, 232, LNG tank pressure sensor 260, LNG tank temperature sensor 264, the cryogenic unit, flow meters, ambient air temperature sensors, compressors, blowers, radiators, batteries, lights, on-board monitoring systems, displays, climate controls (not shown), and the like.

The tender controller on board the tender controls and/or actuates various components on board the tender, such as the vaporizer, the cryogenic unit, control valves (e.g., valve 230 and valve 232), one or more pumps, and/or other components on board the tender, by sending commands to such components. The commands sent by the tender controller may be based on commands sent to the tender controller from the first locomotive controller on board the first locomotive. For example, the first locomotive controller may send a request to the tender controller to stop vaporizing LNG and thereby stopping the conversion of LNG to CNG. In response, the tender controller may actuate the vaporizer to turn off or stop vaporizing LNG.

The tender controller may also monitor fuel tender operating parameters. Such parameters may include, but are not limited to, pressure and temperature of the LNG storage tank, a level or volume of the LNG storage tank, pressure and temperature of the vaporizer, ambient air temperature, and the like. In one example, the tender controller may send a fuel value measurement measured at the LNG storage tank to the first locomotive controller on board the first locomotive.

It will be appreciated that the tender is not limited to the components shown in the example of FIG. 2 and described above. In other examples, the tender may include additional or alternative components. As an example, the tender may further include one or more additional sensors, flow meters, control valves, or the like.

Locomotive may include a throttle 142 coupled to the engine to indicate power levels. In this embodiment, the throttle is depicted as a notch throttle. Additionally, a suitable throttle position may be one selected from an infinitely variable setting level. Each notch of the notch throttle may correspond to a discrete power level, that is, the notch throttle may be a set of discrete, pre-determined power levels. These notch settings may correspond to efficient operating speeds or power levels for the engine, and may further take into account additional factors (such as emissions levels, vibration harmonics, and the like). The power level indicates an amount of load, or engine output, placed on the locomotive and controls the speed at which the locomotive will travel. Although eight notch settings are depicted in the example embodiment of FIG. 2, in other embodiments, the throttle notch may have more than eight notches or less than eight notches, as well as notches for idle and for dynamic brake modes. In some embodiments, the notch setting may be selected by a human operator of the locomotive. In other embodiments, the controller may determine a trip plan including notch settings based on engine and/or locomotive operating conditions.

FIG. 3 depicts an embodiment of a combustion chamber, or cylinder 300, of a multi-cylinder internal combustion engine, such as the engine on board the locomotive described above with reference to FIG. 1. The cylinder may be defined by a cylinder head 301, housing the intake and exhaust valves and liquid fuel injector, described below, and a cylinder block 303.

The engine may be controlled at least partially by a control system including controller which may be in further communication with a vehicle system, such as the locomotive described above with reference to FIG. 1. As described above, the controller may further receive signals from various engine sensors including, but not limited to, engine speed, engine load, boost pressure, exhaust pressure, ambient pressure, $CO_2$ levels, exhaust temperature, $NO_x$ emission, engine coolant temperature (ECT) from temperature sensor 330 coupled to cooling sleeve 328, etc. Correspondingly, the controller may control the vehicle system by sending commands to various components such as alternator, cylinder valves, throttle, fuel injectors, etc.

The cylinder (i.e., combustion chamber) may include cylinder liner 304 with a piston 306 positioned therein. The piston may be coupled to a crankshaft 308 so that reciprocating motion of the piston is translated into rotational motion of the crankshaft. In some embodiments, the engine may be a four-stroke engine in which each of the cylinders fires in a firing order during two revolutions of the crankshaft. In other embodiments, the engine may be a two-stroke engine in which each of the cylinders fires in a firing order during one revolution of the crankshaft.

The cylinder receives intake air for combustion from an intake including an intake passage 310. The intake passage receives intake air via an intake manifold. The intake passage may communicate with other cylinders of the engine in addition to the cylinder 300, for example, or the intake passage may communicate exclusively with the cylinder 300.

Exhaust gas resulting from combustion in the engine is supplied to an exhaust including an exhaust passage 312. Exhaust gas flows through the exhaust passage, to a turbocharger in some embodiments (not shown in FIG. 3) and to atmosphere, via an exhaust manifold. The exhaust passage may further receive exhaust gases from other cylinders of the engine in addition to the cylinder 300, for example.

Each cylinder of the engine may include one or more intake valves and one or more exhaust valves. For example, the cylinder is shown including at least one intake poppet valve 314 and at least one exhaust poppet valve 316 located in an upper region of cylinder. In some embodiments, each cylinder of the engine, including the cylinder, may include at least two intake poppet valves and at least two exhaust poppet valves located at the cylinder head.

The intake valve may be controlled by the controller via an actuator 318. Similarly, the exhaust valve may be controlled by the controller via an actuator 320. During some conditions, the controller may vary the signals provided to the actuators to control the opening and closing of the respective intake and exhaust valves. The position of the intake valve and the exhaust valve may be determined by respective valve position sensors 322 and 324, respectively, and/or by cam position sensors. The valve actuators may be of the electric valve actuation type or cam actuation type, or a combination thereof, for example.

The intake and exhaust valve timing may be controlled concurrently or any of a possibility of variable intake cam timing, variable exhaust cam timing, dual independent variable cam timing or fixed cam timing may be used. In other embodiments, the intake and exhaust valves may be controlled by a common valve actuator or actuation system, or a variable valve timing actuator or actuation system. Further, the intake and exhaust valves may by controlled to have variable lift by the controller based on operating conditions.

In still further embodiments, a mechanical cam lobe may be used to open and close the intake and exhaust valves. Additionally, while a four-stroke engine is described above, in some embodiments a two-stroke engine may be used, where the intake valves are dispensed with and ports in the cylinder wall are present to allow intake air to enter the cylinder as the piston moves to open the ports. This can also extend to the exhaust, although in some examples exhaust valves may be used.

In some embodiments, each cylinder of the engine may be configured with one or more fuel injectors for providing fuel thereto. As a non-limiting example, FIG. 3 shows the cylinder including a fuel injector 326. The fuel injector is shown coupled directly to the cylinder for injecting fuel directly therein. In this manner, the fuel injector provides what is known as direct injection of a fuel into the combustion cylinder. The fuel may be delivered to the fuel injector from a first, liquid fuel system 332, including a fuel tank, fuel pumps, and a fuel rail (described in more detail with respect to FIG. 4). In one example, the fuel is diesel fuel that is combusted in the engine through compression ignition. In other non-limiting embodiments, the fuel may be gasoline, kerosene, biodiesel, or other petroleum distillates of similar density through compression ignition (and/or spark ignition).

Further, each cylinder of the engine may be configured to receive gaseous fuel (e.g., natural gas) alternative to or in addition to diesel fuel. The gaseous fuel may be provided to the cylinder via the intake manifold, as explained below. As shown in FIG. 3, the intake passage may receive a supply of gaseous fuel from a second, gaseous fuel system 334, via one or more gaseous fuel lines, pumps, pressure regulators, etc., located upstream of the cylinder. In some embodiments, the gaseous fuel system may be located remotely from the engine, such as on a different rail car (e.g., on a fuel tender car), and the gaseous fuel may be supplied to the engine via one or more fuel lines that traverse the separate cars. However, in other embodiments the gaseous fuel system may be located on the same rail car as the engine.

A plurality of gas admission valves, such as gas admission valve 336, may be configured to supply gaseous fuel from the gaseous fuel system to each respective cylinder via respective intake passages. For example, a degree and/or duration of opening of the gas admission valve may be adjusted to regulate an amount of gaseous fuel provided to the cylinder. As such, each respective cylinder may be provided with gaseous fuel from an individual gas admission valve, allowing for individual cylinder control in the amount of gaseous fuel provided to the cylinders. However, in some embodiments, a single-point fumigation system may be used, where gaseous fuel is mixed with intake air at a single point upstream of the cylinders. In such a configuration, each cylinder may be provided with substantially similar amounts of gaseous fuel. To regulate the amount of gaseous fuel provided by the single-point fumigation system, in some examples a gaseous fuel control valve may be positioned at a junction between a gaseous fuel supply line and the engine intake air supply line or intake manifold. The gaseous fuel control valve degree and/or duration of opening may be adjusted to regulate the amount of gaseous fuel admitted to the cylinders. In other examples, the amount of gaseous fuel admitted to the cylinders in the single-point fumigation system may be regulated by another mechanism, such as control of a gaseous fuel regulator, via control of a gaseous fuel pump, etc.

FIG. 4 illustrates multiple cylinders of engine 118, including cylinder 300, cylinder 402, cylinder 404, and cylinder 406. While four cylinders arranged in-line are illustrated in FIG. 4, such an arrangement is non-limiting, and other engine configurations are possible. For example, the engine may be a V-6, V-8, V-12, V-16, I-6, I-8, or other engine type. The engine may be supplied one or more of liquid fuel from the liquid fuel system and gaseous fuel from the gaseous fuel system. As such, each cylinder of the engine includes a liquid fuel injector, including injector 326 as well as injectors 408, 410, and 412. Each liquid fuel injector is supplied with liquid fuel from a common fuel rail 414. The common fuel rail may be supplied with fuel from a liquid fuel tank (e.g., the diesel fuel storage tank) via the liquid fuel fluidic coupling. The fuel may be provided at a high pressure via one or more fuel pumps, such as pump 418. The liquid fuel in the liquid fuel system may be diesel fuel or another liquid fuel, such as gasoline, alcohol, etc. Further, while a common fuel rail system is illustrated in FIG. 4, a non-common rail unit pump injection system may be used.

Each cylinder of engine may similarly include a gas admission valve to supply gaseous fuel, including gas admission valve 336 as well as gas admission valves 422, 424, and 426. Each gas admission valve may be positioned in an intake passage of a respective cylinder, or other suitable location. The gas admission valves may be supplied gaseous fuel, such as natural gas, from a gaseous fuel passage 428. The gaseous fuel passage may receive gaseous fuel from a gaseous fuel tank (such as the LNG storage tank 212) via a gaseous fuel supply line, such as the CNG fluidic coupling. As explained previously, the LNG storage tank may be located remotely from engine, such as on board the tender, and may supply fuel to the CNG fluidic coupling via the CNG fluidic coupling. However, in some embodiments, the individual gas admission valves may be dispensed with, and all the cylinders may be supplied with the same gaseous fuel/intake air mixture from an upstream single-point fumigation system.

In some examples, an air purge line 434 may be fluidically coupled to CNG fluidic coupling in order to route fresh air (via an air filter, for example) through the gaseous fuel supply lines. Additionally, a gaseous fuel vent line 436 may route gaseous fuel to atmosphere during some conditions, explained in further detail below with respect to FIG. 9. Further still, a pressure regulator 438 may be positioned in the CNG fluidic coupling and configured to control the pressure of the gaseous fuel supplied to the engine.

The flow of gaseous fuel and/or air through the gaseous fuel system may be controlled by one or more gaseous fuel valves. As explained previously, a control valve 232 may be present on board the tender to control passage of gaseous fuel from the vaporizer to the locomotive. Other gaseous fuel valves may be present on board the locomotive, including an air purge valve 440 positioned in the air purge line, a first gaseous fuel valve positioned in the CNG fluidic coupling upstream of the pressure regulator, a second gaseous fuel valve 444 coupled across the pressure regulator in a bypass passage, a third gaseous fuel valve 446 positioned in CNG fluidic coupling downstream of the pressure regulator, and a vent valve 448 positioned in the gaseous fuel vent line. Each of the gaseous fuel valves as wells the vent and purge valves on board the locomotive described above may be controlled by controller. However, in some embodiments one or more of the valves may be a pressure-sensitive valve that opens and closes based on a pressure across the valve, and not based on a command from the controller. Further, other manually controlled valves (e.g., check valves) not illustrated may be present in the gaseous fuel system.

Each liquid fuel injector of each cylinder, as well as each gas admission valve of each cylinder, may be individually controlled by a controller (such as controller) to enable individual cylinder control of the fuel supply. Accordingly, each cylinder may be operated with varying levels of liquid fuel and/or gaseous fuel. In some embodiments, the liquid fuel injectors may be controlled by a different controller than the controller that controls the gas admission valves. Further, in a gaseous fumigation system, rather than controlling the individual gas admission valves, a single gaseous fuel control valve or other gaseous fuel control element may be controlled by the controller to regulate the amount of gaseous fuel admitted to the cylinders.

In an example, a mixture of gaseous fuel and air may be provided to cylinder 300 via the intake passage and, in some embodiments, the gas admission valve. Then, during compression, diesel fuel may be injected to cylinder 300 via fuel injector 326. The diesel fuel may be ignited via compression ignition and subsequently ignite the gaseous fuel. Similar combustion events may occur for each cylinder of engine.

Thus, the systems described above with respect to FIGS. 1-4 provide for a multi-cylinder engine adapted to combust liquid fuel, and in some modes of operation, both liquid and gaseous fuel according to various control methods stored on and configured to be executed by a control system (including the controller). As further explained below with respect to FIGS. 5-9, these control methods may include the locomotive operating with liquid and/or gaseous fuel combustion in a self-load mode or in conventional propulsion mode. Further, the control methods may specify that the locomotive operate under various test modes in order to diagnose degradation of various components of the gaseous fuel system. Further still, the control methods may provide for venting excess gaseous fuel from the gaseous fuel system prior to engine shutdown.

Turning now to FIG. 5, a high-level control method 500 for operating a vehicle having a multi-fuel capable engine, such as a locomotive or other rail vehicle, is illustrated. Method 500 may be carried out according to instructions stored on a control system, such as controller 136. At 502, method 500 includes determining operating parameters. The determined operating parameters may include, but are not limited to, desired vehicle operating state (e.g., self-load or propulsion, explained in more detail below), notch throttle setting, liquid and gaseous fuel tank storage levels, vehicle and/or tender maintenance status (e.g., if one or more of the vehicle or fuel tender has recently undergone is currently undergoing maintenance), engine on/off requests, engine speed, engine temperature, etc.

At 504, if indicated by the operating conditions, the engine operates in liquid fuel only or in multi-fuel mode, as explained in more detail below with respect to FIG. 6. Briefly, engine operation in a liquid fuel only mode or in a multi-fuel mode may include combusting liquid and/or gaseous fuel in the engine according to a predetermined substitution ratio in order to provide commanded engine output (which may be determined based on the commanded notch throttle setting, for example). The engine output may be transferred to one or more tractive motors via a power conversion unit during a propulsion mode, or the engine output may be transferred to set of resistors via the power conversion unit and dissipated as heat during a self-load mode.

At 506, it is determined if a gaseous fuel system performance test is indicated. The gaseous fuel system performance test may be performed the first time a fuel tender is brought into operation, or it may be performed after maintenance has performed on the fuel tender and/or rail vehicle. Thus, determining if the gaseous fuel performance test is indicated may include determining the operational age of the fuel tender and/or other components of the gaseous fuel system (based on input from an operator of the locomotive, for example), determining if maintenance was recently performed on the fuel tender and/or other components of the gaseous fuel system, or other parameters. The gaseous fuel system performance test may include determining if the gaseous fuel system is sufficiently able to deliver requested gaseous fuel to the locomotive or other vehicle engine over a range of engine operating points while the locomotive operates in a self-load mode. Thus, the gaseous fuel system performance test may be performed before the locomotive or other vehicle operates in a propulsion mode. If the gaseous fuel system performance test is indicated, method 500 proceeds to 508 to perform the gaseous fuel system performance test, which will be described in more detail below with respect to FIG. 7.

If the gaseous fuel system performance test is not indicated, or upon completion of the gaseous fuel system performance test, method 500 proceeds to 510 to determine if a gaseous fuel system leak test is indicated. The gaseous fuel system leak test may be performed to determine if a leak is present in one or more components of the gaseous fuel system. For example, the leak test may indicate the presence of a leak in the fuel supply line, one or more of the gas admission valves, or the gaseous fuel passage coupled to the gas admission valves. Further, in some examples, the gaseous fuel system leak test may indicate the presence of a leak in the fuel supply line and/or gaseous fuel storage tank on board the fuel tender.

In a first example, the gaseous fuel system leak test may be performed after a predetermined amount of time has elapsed since a previous leak test was performed, for example after one week or one month, or after a predetermined travel distance, such as 100 km. In a second example, the gaseous fuel system leak test may be performed when a set of operating conditions is met (e.g., when the engine switches from multi-fuel mode to liquid-only mode, when the locomotive or other vehicle operates in the self-load mode). In a third example, the gaseous fuel system leak test may be performed upon an indication that a leak may be present in the fuel system, such as if actual engine output is less than commanded engine output. The gaseous fuel system leak test may be performed immediately after the gaseous fuel system performance test is performed in some examples, or it may be performed immediately after the determination that the gaseous fuel system performance test is not indicated. In other examples, the gaseous fuel system leak test may be performed after an amount of time has elapsed following performance of the system performance test or following the determination that the performance test is not indicated. As such, method 500 may include continuing to operate the engine in liquid-only or multi-fuel mode according to operating parameters, in order to provide desired engine output, prior to performing the gaseous fuel system leak test.

If performance of the gaseous fuel system leak test is indicated, method 500 proceeds to 512 to perform the gaseous fuel system leak test, which will be described in more detail below with respect to FIG. 8. If the leak test is not indicated, or upon completion of the leak test, method 500 proceeds to 514 to determine if an engine shutdown request is received. The engine shutdown request may be received in response to an operator input, in response to a predetermined trip planner indicating the current trip has ended, or in response to an emergency stop request received based on indicated engine, locomotive, and/or fuel tender degradation, for example.

If an engine shutdown request is not received, method 500 proceeds to 518 to continue to operate the engine in liquid fuel only or multi-fuel mode, according to operating conditions (such as those explained below with respect to FIG. 6). Method 500 then returns to 510 to continue to assess if a leak test is indicated and if an engine shutdown request is received. If an engine shutdown request is received, method 500 proceeds to 516 to vent gaseous fuel prior to shutting the engine down, which will be explained in more detail below with respect to FIG. 9. After shutting down the engine, method 500 ends.

FIG. 6 is a method 600 for operating a multi-fuel capable engine. Method 600 may be carried out according to instructions stored on a control system, such as controller 136, in order to operate an engine with either liquid fuel only combustion or with liquid fuel and gaseous fuel combustion. Further, method 600 may be carried out in order to operate the engine in either a self-load mode where engine output is dissipated as heat or to operate the engine in a propulsion mode where engine output is used to propel the vehicle (e.g., locomotive) in which the engine is installed, such as via one or more tractive motors. Method 600 may be executed during a portion or an entirety of method 500 of FIG. 5.

At 602, method 600 includes determining if self-load operation is indicated. As explained above, self-load operation includes at least a portion of the engine output produced from combustion being dissipated as heat rather than being used to propel the vehicle in which the engine installed. Self-load operation may be carried out during maintenance of the locomotive or other vehicle or fuel tender (e.g., in order to allow operation of various engine and/or vehicle components without movement of the vehicle), during one or more diagnostic routines (such as when the gaseous fuel system performance test or leak test is carried out), and/or during an extended idle operation. Thus, self-load operation may be indicated based on a request from an operator, based on a commanded diagnostic routine being performed, and/or based on a set of operating parameters being met (such as notch throttle at idle with battery and/or capacitance state of charge above a threshold).

If self-load operation is indicated, method 600 proceeds to 610, which will be explained in more detail below. If self-load operation is not indicated, method 600 proceeds to 604 to set the fuel substitution ratio based on operating parameters. Engines configured to operate with both liquid and gaseous fuel may be operated with as much gaseous fuel as possible while still maintaining requested engine power. For example, in standard liquid-fueled engines, such as diesel engines, 100% of produced engine power may be derived from combustion of diesel fuel. In multi-fuel engines, a portion of the engine power may be derived from gaseous fuel while the remaining engine power may be derived from liquid fuel. For example, as much as 80% of produced engine power may be derived from combustion of gaseous fuel, with the remaining 20% of power derived from the combustion of diesel fuel. The amount of gaseous fuel "substituted" for the liquid fuel may be referred to as a substitution ratio. The substitution ratio may reflect the portion of engine power derived from gaseous fuel. For example, a substitution ratio of 80 indicates 80% of the power is derived from gaseous fuel, while a substitution ratio of 50 indicates 50% of the power is derived from gaseous fuel. A substitution ratio of 0 indicates liquid-only operation.

The substitution ratio may be set based on engine temperature, desired fuel type, notch throttle position, relative fuel levels in each fuel tank (e.g., if the level of gaseous fuel is below a threshold, more liquid fuel may be used), vehicle location (e.g., whether the vehicle is in a tunnel), and/or other parameters. At 606, the gaseous and/or liquid fuel is supplied to each cylinder of the engine at the set substitution ratio. In some examples, the set substitution ratio may be the same for all cylinders. In other examples, one or more cylinders may have different substitution ratios.

If the substitution ratio is greater than zero (e.g., if at least some gaseous fuel is supplied), the gaseous fuel may be premixed with intake air and combusted due to compression ignition of the injected liquid fuel. The liquid fuel may be injected at a prescribed time during the combustion cycle (such as the end of the compression stroke or beginning of the power stroke) such that the liquid fuel ignites quickly after injection due to increased cylinder temperature at high compression levels. The ignited liquid fuel may then ignite the premixed gaseous fuel and air. At 608, power produced by the combustion in the engine is transferred to a plurality of tractive motors via the power conversion unit to propel the vehicle.

Returning to 602, if is determined that self-load operation is indicated, method 600 proceeds to 610 to receive a request to operate in either liquid fuel only mode or in multi-fuel mode. In some examples, the request may be sent responsive to input from an operator. For example, during the self-load operation, the fuel tender may be undergoing maintenance. As such, the operator may request operation with liquid fuel only combustion to avoid the transmission of gaseous fuel during the maintenance procedure. In another example, the operator may request multi-fuel operation when the fuel tender is undergoing maintenance in order to allow various components of the fuel tender to be assessed while the fuel tender is supplying gaseous fuel to the locomotive. In further examples, operation in liquid fuel only or in multi-fuel mode may be determined automatically by the controller based on operating parameters, as explained above. In still further examples, the engine may be operated in multi-fuel mode during self-load operation when the gaseous fuel system performance test is being performed, explained in more detail below.

At 612, method 600 includes setting the fuel substitution ratio based on operating parameters. When the engine is operated with multi-fuel combustion during the self-load mode, the substitution ratio may be set based on the same factors as during the propulsion mode, such as based on the notch throttle setting. At 614, the power output from the engine is transferred to the power conversion unit and dissipated via the set of resistors.

Thus, method 600 of FIG. 6 provides for operating a vehicle, such as a locomotive, in either a self-load mode or in a propulsion mode. During the self-load mode, the engine may be operated with either liquid fuel only combustion (e.g., the engine may combust only diesel fuel) or with multi-fuel combustion (e.g., the engine may combust both diesel and natural gas). When operating in the self-load mode, the decision to combust either only liquid fuel or both liquid and gaseous fuel may be made automatically based on operating conditions (e.g., if a gaseous fuel system performance test is being performed, the engine will be operated with multi-fuel combustion). However, in some conditions the operator of the vehicle may choose if the engine operates with only liquid fuel combustion or if the engine operates with multi-fuel combustion, based on the maintenance state of the locomotive or fuel tender, for example.

Turning to FIG. 7, a method 700 for performing a gaseous fuel system performance test is presented. Method 700 may be carried out by a control system, such as controller, according to instructions stored thereon. As explained above with respect to FIG. 5, the gaseous fuel system performance test may be carried out prior to the fuel tender being put into operation, for example following manufacture of the fuel tender or following maintenance of the fuel tender. Additionally, as explained above with respect to FIG. 6, the gaseous fuel system performance test may be carried out during a self-load operation, such as the self-load operation described above with respect to FIG. 6.

At 702, method 700 includes delivering liquid and gaseous fuel to the engine at a specified substitution ratio and notch throttle setting. The specified substitution ratio and notch throttle setting may be based on the progression of the performance test. For example, the gaseous fuel system performance test may include a series of engine operating points, including a series of substitution ratios and notch throttle settings, that the engine is operated under to determine that the fuel tender is delivering gaseous fuel to the locomotive at amounts and/or rates requested by the locomotive controller. Thus, when the performance test is initially started, the engine may be operated with a first specified substitution ratio and a first specified notch throttle setting. Then, as the performance test progresses, the substitution ratio may be incrementally adjusted such that the engine is operated over a range of substitution ratios, such as from a minimum substitution ratio (e.g., zero) to a maximum substitution ratio (e.g., 80). Likewise, as the performance test progresses, the notch throttle setting may be incrementally adjusted such that the engine is operated over a range of notch throttle settings, such as from a minimum notch setting (e.g., idle) to a maximum substitution ratio (e.g., notch 8).

As used herein, a minimum engine operating point, such as minimum notch throttle setting, comprises the lowest operating point possible, with no lower operating points below it. Thus, the minimum notch throttle setting may be idle or dynamic braking, and the minimum substitution ratio may be zero (e.g., no gaseous fuel). The maximum engine operating point comprises the highest operating point possible, with no higher operating points above it. Thus, the maximum notch throttle setting may be notch eight for a standard notch-eight throttle, although higher or lower notch settings are possible. The maximum substitution ratio may be 100 in some examples (with no liquid fuel delivered), or may be a ratio lower than 100 (for example, it may be the ratio with the highest amount of gaseous fuel possible that still maintains combustion).

In some examples, the specified engine operating points over which the engine is operated during the performance test may include operating points predicted to be encountered during a subsequent engine operating period (where the engine is operating to propel the vehicle in which it is installed, for example). In some examples, the predicted engine operating points may include the full range of operating points described above. In other examples, the predicted engine operating points may include only a subset of the full range of operating points. In one example, a trip plan may be determined for the subsequent engine operation that includes predicted location, vehicle speed, grade, traction, notch throttle setting, etc., for each segment of the subsequent engine operation. Based on the trip plan, the specified operating points may be determined, and during the performance test, the engine may be operated at each of the specified operating points.

After the liquid and/or gaseous fuel is delivered to the engine at the specified substitution ratio and specified notch throttle setting, the power from the engine is transferred to the power conversion unit and dissipated via the set of resistors at 704. At 706, the engine fuel system parameters are monitored. The monitored parameters may include engine output, gaseous fuel supply pressure, engine temperature, and/or other engine or fuel system parameters. The engine output may be monitored by monitoring one or more of engine speed (based on feedback from an engine speed sensor, for example), engine temperature (based on feedback from a temperature sensor positioned to determine engine coolant temperature, for example, or based on feedback from an exhaust temperature sensor), exhaust pressure (based on feedback from an exhaust pressure sensor, for example), and load on the power conversion unit.

At 708, method 700 includes determining if the measured parameters are different than expected. In an example where engine output is monitored, the measured engine output may be determined to be different than the expected engine output if the measured engine output differs from the expected engine output by more than a threshold, such as by more than 5%. If the measured parameters are different than expected, method 700 proceeds to 710 to indicate degradation of the gaseous fuel system and take default action. Indicating degradation may include outputting a notification to an operator of the locomotive that the gaseous fuel system may be degraded, as indicated at 711. The default action may include notifying an operator to have maintenance performed on the fuel tender or other components of the gaseous fuel system (e.g., gas admission valves) before putting the gaseous fuel system into operation and/or setting a diagnostic code. If degradation of the gaseous fuel system is indicated, the engine may be operated with liquid fuel only combustion and without gaseous fuel combustion, and/or the engine may be shutdown.

If the engine output is not different than expected, method 700 proceeds to 712 to determine if the engine has been operated with all the specified substitution ratios and notch throttle settings. For example, as explained above, the engine may be operated over a range of substitution ratios, starting at zero and progressing to a maximum allowable substitution ratio. For example, the engine may be operated at the substitution ratios of 0, 10, 20, 30, 40, 50, 60, 70, and 80, with engine output monitored and compared to expected output at each substitution ratio. Similarly, the engine may be operated over a range of notch throttle settings, for example the engine may be operated at each notch throttle setting, with the expected engine output compared to the measured engine output after operation at each notch throttle setting. Further, the engine may be operated over a range substitution ratios and notch throttle setting combinations, such as operated at more than one substitution ratio per notch throttle setting. Other engine operating points during the gaseous fuel system performance test are possible. It is to be understood that while some notch throttle settings may be capable of being operated at with more than one substitution ratio, other notch throttle settings may have only one substitution ratio at which the engine can be operated. For example, when the notch throttle is set to zero or to notch 8, it may only be possible to operate the engine with liquid fuel only combustion, and thus only one substitution ratio (zero) may be possible.

If method 700 determines that the engine has been operated at all the operating points (e.g., substitution ratios and notch throttle settings) specified by the gaseous fuel system performance test, method 700 proceeds to 714 to indicate that no degradation of the gaseous fuel system is present, and an operator is notified of the test results at 715. If it is determined that not all of the specified engine operating points have been reached, method 700 proceeds to 716 to adjust the substitution ratio and/or notch throttle setting to the next specified substitution ratio and/or notch throttle setting, and then method 700 returns to 702 to repeat the fuel delivery, power transfer, and monitoring of the engine output.

Thus, method 700 of FIG. 7 provides for testing the performance of the gaseous fuel system after maintenance or during initial operation of the gaseous fuel system. The test includes operating the locomotive in a self-load and multi-fuel mode. The test also includes incrementing through various engine operating points, from 0-max substitution ratio, idle to notch 8 notch throttle setting, into and out of multi-fuel mode, etc., to hit performance boundaries. The engine output is monitored (e.g., based on exhaust temperature, exhaust pressure, and/or alternator load, for example) to determine if actual output matches the expected output for the commanded notch setting. During execution of the performance test, information may be displayed to an operator of the locomotive on a display of the locomotive, for example, to allow the operator to see how the gaseous fuel system is performing during the test. The displayed information may include information received from the fuel tender, such as gaseous fuel pressure in the fuel tender, gaseous fuel flow rate, instructions received from the locomotive controller, etc.

FIG. 8 illustrates a method 800 for performing a gaseous fuel system leak test. Method 800 may be carried by a control system, such as controller, according to instructions stored thereon, in order to determine if a leak is present in the gaseous fuel system. As explained above with respect to FIG. 5, the leak test may be performed when indicated by a specified elapsed amount of time or travel distance since a previous test was performed, and/or based on a set of operating conditions being met. The leak test may be performed during a self-load mode or during a propulsion mode.

At 802, method 800 includes sending a request to the gaseous fuel system to deliver gaseous fuel to the engine. The request may include sending a request to the fuel tender (e.g., by sending the request to the fuel tender controller) to vaporize stored liquefied fuel into gaseous fuel and send the gaseous fuel to the locomotive. The request may also include adjusting a pressure regulator and/or one or more gaseous fuel control valves to increase the pressure in the gaseous fuel supply line to a threshold pressure.

At 804, method 800 includes sending a request to close one or more gaseous fuel valves in the gaseous fuel system. The gaseous fuel valves closed in response to the request may include a fuel valve coupled between the vaporizer and the locomotive (e.g., valve 232), one or more gaseous fuel valves positioned in the gaseous fuel supply line on the locomotive (e.g., valves 442, 444, and/or 446), and/or one or more gas admission valves. At 806, method 800 includes operating the engine with liquid fuel only combustion. Operation with liquid fuel only combustion may include sending a request to the fuel tender to stop sending gaseous fuel to the locomotive. By initially supplying gaseous fuel to the engine, and then closing one or more gaseous fuel valves, the gaseous fuel system may be segmented into portions that can be monitored for expected changes in fuel pressure as the pressure in the fuel supply line decays following the closure of the valves and/or cessation of the gaseous fuel supply, e.g., gaseous fuel may slowly leak past the gas admission valves into the engine.

At 808, the pressure drop across each closed gaseous fuel valve is monitored, and compared to an expected pressure drop. The pressure drop may be monitored based on output from one or more pressure sensors in the gaseous fuel supply line, for example. The output from one or more of the pressure sensors may be received via the fuel tender controller in some examples. At 810, it is determined if any of the monitored pressure drops is different than a respective expected pressure. For example, the pressure may be expected to decrease at a certain predetermined rate (based on the initial fuel line pressure and known leakage rate of the gas admission valves, for example). A pressure drop different than expected may include the monitored pressure decreasing faster than the predetermined rate, e.g., by more than a threshold amount, such decreasing at a rate 5% or 10% faster than expected. If none of the monitored pressures is different than expected, method 800 proceeds to 812 to indicate that no leaks are present in the gaseous fuel system and output a notification that no leaks are present for display to an operator. If any one of the monitored pressures is different than the respective expected pressure, method 800 proceeds to 814 to indicate a gaseous fuel system leak is detected and a notification of the leak is output to an operator. The notification may include an indication of which segment of the gaseous fuel system includes the leak. Further, in some examples, when a gaseous fuel system leak is detected, multi-fuel operation may be stopped until the leak is repaired (e.g., the gaseous fuel supply may be disabled and the engine operated with liquid fuel only combustion, of the engine may be shut down).

Thus, method 800 of FIG. 8 detects fuel leaks in a gaseous fuel system. The method includes sending a request to the fuel tender to send gaseous fuel to the engine on board the locomotive. One or more gaseous fuel valves are closed to segment the gaseous fuel system into sections and each section is monitored for a drop in fuel pressure. Fast pressure drops indicate a leak in the gaseous fuel system. The monitored sections may include from the LNG storage tank to the vaporizer, the vaporizer to locomotive, and the locomotive to engine (via the gas admission valves). Thus, the method also includes sending a request to close one or more gaseous fuel valves, receiving information indicative of pressure in the gaseous fuel line supply line (both on board the locomotive and on board the fuel tender), and if the pressure is different than expected, indicating leak is present and taking default action. The default action may include stopping multi-fuel operation.

FIG. 9 illustrates a method 900 for venting excess fuel from a gaseous fuel system prior to shutdown of the engine. Method 900 may be carried out according to instructions stored on a control system, such as controller, in response to a request to shut down the engine, such as the engine shutdown request explained above with respect to FIG. 5. In some examples, method 900 may be performed when switching from operation in multi-fuel mode to operation in liquid-fuel only mode. The gaseous fuel is vented through the engine, where it does not undergo combustion but is instead routed through the engine exhaust system, which in some examples includes one or more exhaust emission control devices to convert the unburned gaseous fuel rather than releasing it to atmosphere.

At 902, method 900 includes sending a request to a gaseous fuel system to stop delivering gaseous fuel to the engine. The request may be sent to a controller on board the fuel tender, and in response the vaporizer and/or gaseous fuel pump may be deactivated and/or one or more fuel valves on the fuel tender may be closed. At 904, the engine is operated at idle with liquid fuel only combustion. At 906, the gas admission valves of the engine are opened. Further, a request may be sent to open other valves in the gaseous fuel supply line and/or on the fuel tender, such as valve 232 and/or valves 442 and 446. In doing so, the gaseous fuel remaining in the gaseous fuel supply line may be drawn into the engine due to the vacuum created by operating the engine at idle. The gaseous may not be combusted in the cylinders, however, due to the relatively low amount of gaseous fuel in each cylinder. Rather, the gaseous fuel is routed through the engine to the engine exhaust system.

In some embodiments, the locomotive may include a purge line fluidically coupled to the gaseous fuel supply line. Gas, such as ambient air, fresh air, inert gas, etc., may be routed through the gaseous fuel supply line via the purge line to purge any remaining gaseous fuel out of the supply line. To optimize flow of purge gas through the gaseous fuel supply line, a bypass passage around the pressure regulator may be provided. Thus, method 900 may optionally include at 908 sending a request to open one or more additional gaseous fuel valves, such as valve 444 in the bypass passage coupled across the pressure regulator, and at 910, opening an admission valve in a purge line, such as valve 442, to purge gas through the fuel supply line.

At 912, method 900 determines if gaseous fuel in the gaseous fuel supply line is below a threshold. The threshold may be a suitable threshold amount of gaseous fuel, such as any detectable gaseous fuel. Whether the gaseous fuel in the gaseous fuel supply line is below the threshold may be determined based on a sensor that detects the amount and/or flow rate of the gaseous fuel in the supply line, or based on a predetermined duration of the gaseous fuel venting. If it is determined that the gaseous fuel is not below the threshold, method 900 proceeds to 914 to continue to operate at idle with the gas admission valves open and then method 900 loops back to 912. If it is determined that the amount of gaseous fuel has dropped below the threshold, method 900 proceeds to 916 to take default action, such as shutting down the engine or operating in liquid-fuel only mode, and method 900 ends.

Thus, method 900 of FIG. 9 provides for venting excess gaseous fuel to an engine exhaust system. Upon indication that the locomotive is about to shutdown, the notch throttle is set to idle to cause intake manifold vacuum. The valves in the gaseous fuel system are opened to supply gaseous fuel in supply line to the engine (while not supplying new fuel from the gaseous fuel tank). In this way, the engine will suck gaseous fuel out of the supply line to the cylinders (but with the substitution ratio too low to combust the gaseous fuel, it will just travel through cylinders and out the exhaust). The method may further supply fresh air to the gaseous supply line to further purge the fuel. In some examples, instead of building vacuum with idle engine operation, the air purge line could be pressurized with pressurized air to purge the gaseous fuel to the engine. Purge of the gaseous fuel may occur for a predetermined amount of time and/or until a gaseous fuel detection unit near the engine indicates that there is no gaseous fuel left in supply line.

Method 900 illustrates a venting routine that may be carried out during standard engine shutdown. However, during certain conditions, such as if degradation of a turbocharger or other vehicle or engine component is detected, the engine may be immediately shutdown to prevent catastrophic damage to the engine or vehicle. Such a shutdown may be referred to as an emergency shutdown. During an emergency shutdown, operation at idle to vent the gaseous fuel to the engine may not be desired. Accordingly, a vent valve in a passage fluidically coupling the gaseous fuel supply line to atmosphere may be opened, such as valve 448, to quickly purge the gaseous fuel to atmosphere.

Additionally, in some embodiments when the engine is run at idle to create vacuum in intake manifold and draw in ambient air at the far end of fuel supply line and consume the remaining gaseous fuel in the supply line, gases other ambient air may be drawn in, such as generic versions, e.g., inert, atmospheric, etc. Further, when an intake manifold pressure is present (e.g., no intake vacuum), the engine may be operated at other engine load levels which will require a pressurized gas source on or off the locomotive in order to overcome the intake manifold pressure. This could include ambient air or a specific type of gas like "inert gas," etc. Further still, when the engine is turned off before the gaseous fuel is vented to the engine, the gaseous fuel could bypass the engine and be vent to atmosphere or to a recapture vessel.

Thus, the systems and methods described herein provide for monitoring the health of a vehicle, such as a locomotive, in conjunction with the health of a gaseous fuel supply. In some examples, the gaseous fuel supply may be at least partially included on fuel tender remote from the locomotive. Accordingly, the locomotive and fuel tender may be monitored as an integrated system to detect a system issue such as degradation of fuel tender performance or a gaseous fuel system leak, and report the issue to an operator of the locomotive.

In an embodiment, a system comprises a liquid fuel system to deliver liquid fuel to an engine; a gaseous fuel system to deliver gaseous fuel to the engine; and a control system configured to: during a gaseous fuel system test mode, control the liquid fuel system and the gaseous fuel system to deliver the liquid fuel and the gaseous fuel to the engine over a range of engine operating points; and indicate degradation of the gaseous fuel system based on engine output at each of the engine operating points. In an example, the degradation may be indicated by the control system outputting a notification for display to an operator.

The system may further comprise a power conversion unit coupled to the engine and a power dissipater unit (e.g., set of resistors) coupled to the power conversion unit and configured to dissipate power from the power conversion unit as heat, and wherein the control system is configured to, during the gaseous fuel system test mode, transfer power from the engine to the power conversion unit and dissipate the power via power dissipation unit.

In one example, the range of engine operating points may include each notch throttle setting predicted to be operated at during a subsequent engine operating period, from idle to a maximum notch throttle setting. In another example, the range of engine operating points includes a range of ratios of an amount of gaseous fuel relative to an amount of liquid fuel predicted to be operated at during a subsequent engine operating period, from a minimum ratio to a maximum ratio.

The control system may be configured to determine engine output based on one or more of exhaust temperature, exhaust pressure, or power conversion unit load. The control system may also be configured to, during a self-load mode, operate the engine with either liquid fuel only or liquid and gaseous fuel based on operator input, and transfer power from the engine to the power conversion unit and dissipate the power. The control system may be configured to, during a propulsion mode, operate engine with either liquid fuel only or liquid and gaseous fuel based on engine operating conditions and transfer power from the engine to a plurality of tractive motors via the power conversion unit.

Another embodiment for a system comprises a liquid fuel system to deliver liquid fuel to an engine; a gaseous fuel system to deliver gaseous fuel to the engine, the gaseous fuel system comprising: a gaseous fuel supply fluidically coupled to the engine via a gaseous fuel supply line; one or more gaseous fuel valves positioned in the gaseous fuel supply line; and one or more gas admission valves positioned between the gaseous fuel supply line and the engine; and a control system configured to: responsive to a request to vent excess gaseous fuel in the gaseous fuel system, operate the engine at idle with liquid fuel-only combustion; send a request to stop sending fuel from the gaseous fuel supply to the engine; and send a request to open the one or more gaseous fuel valves and the one or more gas admission valves.

The gaseous fuel supply may include a fuel tank and a vaporizer located remotely from the engine. The one or more gaseous fuel valves may include a bypass valve coupled across a pressure regulator. The system may further comprise an air purge line coupled to the fuel supply line, and the control system may be configured to open an air purge line admission valve positioned in the air purge line responsive to the request to vent the gaseous fuel. The control system may be configured to maintain the one or more gaseous fuel valves and the one or more gas admission valves open for a predetermined amount of time and/or until a gaseous fuel detection unit positioned in the fuel supply line near the engine indicates an amount of gaseous fuel in the supply line has dropped below a threshold amount. The control system may be configured to, after the predetermined amount of time is reached and/or after the amount of gaseous fuel in the supply line has dropped below the threshold amount, shutdown the engine or operate in a liquid fuel-only mode.

A further embodiment for a system comprises a liquid fuel system to deliver liquid fuel to an engine; a gaseous fuel system to deliver gaseous fuel to the engine; and a control system configured to: during a gaseous fuel leak detection mode, send a request to the gaseous fuel system to deliver gaseous fuel to the engine; send a request to close one or more gaseous fuel valves in the gaseous fuel system and operate the engine with liquid fuel-only combustion; monitor a respective pressure drop across each of the one or more closed gaseous fuel valves; and if a pressure drop across at least one of the closed gaseous fuel valves is different than expected (e.g., exceeds a determined threshold value), indicate a leak in the gaseous fuel system.

The one or more gaseous fuel valves may comprise a gaseous fuel valve positioned in a gaseous fuel supply line between a fuel tank and a vaporizer. In an example, the control system is configured to monitor a pressure drop across the closed gaseous fuel valve by receiving information indicating a pressure upstream and a pressure downstream of the closed gaseous fuel valve. The one or more gaseous fuel valves may comprise one or more gaseous fuel valves positioned in a gaseous fuel supply line between a vaporizer and the engine. In one example, the control system is configured to monitor a respective pressure drop across each of the one or more closed gaseous fuel valves by receiving information indicating a respective pressure upstream and a respective pressure downstream of each of the one or more closed gaseous fuel valves. The control system may be configured to continue to operate the engine with liquid fuel-only combustion if a leak in the gaseous fuel system is indicated. The control system may be configured to, when indicated by engine operating parameters, resume delivering gaseous fuel to the engine in order to operate the engine with multi-fuel combustion if a leak in the gaseous fuel system is not indicated.

An embodiment of a system comprises a liquid fuel system to deliver liquid fuel to an engine; a gaseous fuel system to deliver gaseous fuel to the engine; a power conversion unit coupled to the engine and a set of resistors coupled to the power conversion unit and configured to dissipate power from the power conversion unit as heat; and a control system configured to, during a self-load mode of operation of the engine where the power from the power conversion unit is dissipated as heat in the set of resistors: operate the engine with the liquid fuel only responsive to a first operator input; and operate the engine with multi-fuel combustion of the liquid fuel and the gaseous fuel responsive to a second operator input.

In an embodiment, a method for operating an engine adapted to operate with liquid fuel and gaseous fuel comprises: delivering one or more of liquid fuel and gaseous fuel to the engine for combustion in the engine; during a self-load mode of operation, transferring engine output to a set of resistors via a power conversion unit and dissipating the engine output as heat; during a propulsion mode of operation, transferring engine output to a plurality of tractive motors via the power conversion unit; during a gaseous fuel system performance test mode: operating the engine over a range of engine operating points; monitoring engine output at each engine operating point; and indicating degradation of the gaseous fuel system based on engine output at each of the engine operating points; during a gaseous fuel system leak test mode: sending a request to receive gaseous fuel; closing one more gaseous fuel valves; operating with liquid fuel only combustion; monitoring a pressure drop across each closed gaseous fuel valve; and indicating a leak in the gaseous fuel system if at least one of the monitored pressure drops is different than expected; and during a gaseous fuel venting mode performed responsive to a request to shut down the engine: operating the engine at idle; sending a request to stop sending gaseous fuel to the engine; and sending a request to open one or more gaseous fuel valves.

An embodiment relates to a method for operating an engine adapted to operate with liquid fuel and gaseous fuel. The method comprises receiving a request to operate in a self-load mode. The method includes, responsive to receiving the request, selecting a first fuel substitution ratio, delivering one or more of gaseous fuel and liquid fuel to the engine at the first fuel substitution ratio, and transferring engine output to a set of resistors via a power conversion unit and dissipating the engine output as heat. The method includes selecting a second fuel substitution ratio, delivering one or more of the gaseous fuel and liquid fuel to the engine at the second fuel substitution ratio, and transferring engine output to the set of resistors via the power conversion unit.

In an example, selecting a first fuel substitution ratio comprises receiving a request from an operator to operate the engine in a multi-fuel mode and selecting the first fuel substitution ratio based on engine operating parameters. The selected first fuel substitution ratio may be greater than zero such that at least some gaseous fuel is delivered to the engine. Selecting the second fuel substitution ratio comprises receiving a request from the operator to operate the engine in a liquid fuel only mode and delivering only liquid fuel to the engine without delivering gaseous fuel to the engine.

In another example, selecting a first fuel substation ratio comprises receiving a request to perform a gaseous fuel system performance test and selecting a first fuel substitution ratio specified by the gaseous fuel system performance test. Selecting the second fuel substitution ratio comprises selecting a next fuel substitution ratio specified by the gaseous fuel system performance test.

A method for operating an engine adapted to operate with liquid fuel and gaseous fuel is provided. In one example, the method includes receiving a first request to vent gaseous fuel from a gaseous fuel system, operating the engine at idle responsive to the first request, sending a second request to stop sending gaseous fuel to the engine, and sending a third request to open one or more gaseous fuel valves. Responsive to a predetermined amount of time elapsing, the method includes shutting down the engine. The method also includes following the shutting down of the engine, receiving a fourth request to restart the engine, the fourth request further including a request to perform a gaseous fuel system performance test. Responsive to receiving the fourth request, the method includes operating the engine over a range of engine operating points, monitoring engine output at each engine operating point, and indicating degradation of the gaseous fuel system based on engine output at each of the engine operating points. The method may also include, during the operation of the engine over the range of operating points, transferring engine output to a set of resistors via a power conversion unit and dissipating the engine output as heat.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
a liquid fuel system to deliver liquid fuel to an engine;
a gaseous fuel system to deliver gaseous fuel to the engine; and
a control system configured to:
during a gaseous fuel leak detection mode,
send a request to the gaseous fuel system to deliver gaseous fuel to the engine;
send a request to close one or more gaseous fuel valves in the gaseous fuel system and operate the engine with liquid fuel-only combustion;
monitor a respective pressure drop across each of the one or more closed gaseous fuel valves; and
if a pressure drop across at least one of the one or more closed gaseous fuel valves exceeds a determined threshold value, indicate a leak in the gaseous fuel system,
wherein the one or more gaseous fuel valves comprises a gaseous fuel valve positioned in a gaseous fuel supply line between a fuel tank and a vaporizer, and wherein the control system is configured to monitor a pressure drop across the closed gaseous fuel valve by receiving information indicating a pressure upstream and a pressure downstream of the closed gaseous fuel valve based on an output from one or more pressure sensors in the gaseous fuel supply line.

2. The system of claim 1, wherein the one or more gaseous fuel valves includes a bypass valve coupled across a pressure regulator.

3. The system of claim 1, wherein the one or more gaseous fuel valves includes a bypass valve couples across a pressure regulator.

4. The system of claim 1, wherein the control system is further configured to maintain the one or more gaseous fuel valves and one or more gas admission valves open for a predetermined amount of time or until a gaseous fuel detection unit positioned in a gaseous fuel supply line near the engine indicates an amount of gaseous fuel in the supply line has dropped below a threshold amount.

5. The system of claim 4, wherein the control system is configured to, after the predetermined amount of time is reached or after the amount of gaseous fuel in the supply line has dropped below the threshold amount, take a default action including shutting down the engine or operating in liquid fuel-only mode.

6. The system of claim 1, wherein the control system is configured to indicate the leak in the gaseous fuel system by outputting a notification for display to an operator.

7. The system of claim 1, wherein the one or more gaseous fuel valves comprises one or more gaseous fuel valves positioned in a gaseous fuel supply line between a vaporizer and the engine, and wherein the control system is configured to monitor a respective pressure drop across each of the one or more closed gaseous fuel valves by receiving information indicating a respective pressure upstream and a respective pressure downstream of each of the one or more closed gaseous fuel valves.

8. The system of claim 1, wherein the control system is configured to continue to operate the engine with liquid fuel-only combustion if a leak in the gaseous fuel system is indicated.

9. The system of claim 1, wherein the control system is configured to, when indicated by engine operating parameters, resume delivering gaseous fuel to the engine in order to operate the engine with multi-fuel combustion if a leak in the gaseous fuel system is not indicated.

10. The system of claim 1, wherein the liquid fuel is diesel, and the gaseous fuel is natural gas.

11. The system of claim 1, wherein the engine, the liquid fuel system, the gaseous fuel system, and the control system are at least partially onboard a locomotive.

12. A system, comprising:
a liquid fuel system to deliver liquid fuel to an engine;
a gaseous fuel system to deliver gaseous fuel to the engine; and
a control system configured to:
during a gaseous fuel leak detection mode,
send a request to the gaseous fuel system to deliver gaseous fuel to the engine;
send a request to close one or more gaseous fuel valves of the gaseous fuel system and operate the engine with liquid fuel-only combustion;
monitor a respective pressure drop across each of the one or more closed gaseous fuel valves; and
if a pressure drop across at least one of the one or more closed gaseous fuel valves exceeds a determined threshold value, indicate a leak in the gaseous fuel system,
wherein the one or more gaseous fuel valves comprises one or more gaseous fuel valves positioned in a gaseous fuel supply line between a vaporizer and the engine, and wherein the control system is configured to monitor a respective pressure drop across each of the one or more closed gaseous fuel valves by receiving information indicating a respective pressure upstream and a respective pressure downstream of each of the one or more closed gaseous fuel valves based on an output from one or more pressure sensors in the gaseous fuel supply line.

13. The system of claim 12, further comprising a purge line coupled to the gaseous fuel supply line, and wherein the control system is configured to open a purge line admission valve positioned in the purge line responsive to a request to vent the gaseous fuel.

* * * * *